United States Patent
Goya et al.

(10) Patent No.: US 10,792,759 B2
(45) Date of Patent: Oct. 6, 2020

(54) LASER PROCESSING METHOD AND LASER PROCESSING APPARATUS

(71) Applicant: MITSUBISHI HEAVY INDUSTRIES, LTD., Tokyo (JP)

(72) Inventors: Saneyuki Goya, Tokyo (JP); Masato Kinouchi, Tokyo (JP); Atsushi Takita, Tokyo (JP); Minoru Danno, Tokyo (JP); Toshiya Watanabe, Tokyo (JP); Takashi Ishide, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 387 days.

(21) Appl. No.: 14/911,663

(22) PCT Filed: Jan. 26, 2015

(86) PCT No.: PCT/JP2015/052072
§ 371 (c)(1),
(2) Date: Feb. 11, 2016

(87) PCT Pub. No.: WO2015/129362
PCT Pub. Date: Mar. 9, 2015

(65) Prior Publication Data
US 2016/0193693 A1 Jul. 7, 2016

(30) Foreign Application Priority Data
Feb. 28, 2014 (JP) .................. 2014-039643

(51) Int. Cl.
*B23K 26/0622* (2014.01)
*B23K 26/40* (2014.01)
(Continued)

(52) U.S. Cl.
CPC ...... *B23K 26/0622* (2015.10); *B23K 26/0613* (2013.01); *B23K 26/356* (2015.10);
(Continued)

(58) Field of Classification Search
CPC .............. B23K 26/388; B23K 26/0069; B23K 26/0622; B23K 26/40; B23K 26/0613; B23K 26/389
(Continued)

(56) References Cited

U.S. PATENT DOCUMENTS 6,420,677 B1 * 7/2002 Emer .................... B23K 26/40
219/121.71
6,573,474 B1 6/2003 Loringer
(Continued)

FOREIGN PATENT DOCUMENTS

| CA | 2639932 A1 | 8/2007 |
|---|---|---|
| CN | 1796038 A | 3/1998 |

(Continued)

OTHER PUBLICATIONS

Office Action dated Apr. 1, 2017 issued in corresponding Chinese Patent Application No. 201580001583.2 with an English Translation.
(Continued)

*Primary Examiner* — Ibrahime A Abraham
*Assistant Examiner* — John J Norton
(74) *Attorney, Agent, or Firm* — Birch, Stewart, Kolasch & Birch, LLP

(57) ABSTRACT

Provided is a laser processing method in which a laser processing head for irradiating, with at least a short-pulse laser, a processed article having a protection layer laminated to a metal layer is used to process the processed article, whereby high-quality, highly accurate processing is possible by means of a short-pulse laser processing step for irradiating the protection layer with the short-pulse laser and ablating the protection layer, and a metal layer processing step for ablating the metal layer in the area that was ablated during the short-pulse laser processing step.

7 Claims, 30 Drawing Sheets

(51) Int. Cl.
  *B23K 26/382* (2014.01)
  *B23K 26/06* (2014.01)
  *B23K 26/388* (2014.01)
  *B23K 103/16* (2006.01)
  *B23K 26/356* (2014.01)
  *B23K 101/00* (2006.01)

(52) U.S. Cl.
  CPC .......... *B23K 26/388* (2013.01); *B23K 26/389* (2015.10); *B23K 26/40* (2013.01); *B23K 2101/001* (2018.08); *B23K 2103/172* (2018.08)

(58) Field of Classification Search
  USPC ....................................... 219/121.68, 121.69
  See application file for complete search history.

(56) References Cited

U.S. PATENT DOCUMENTS

| | | | |
|---|---|---|---|
| 7,725,210 B2* | 5/2010 | Hoebel | F01D 5/005 219/121.71 |
| 8,624,151 B2 | 1/2014 | Elfizy et al. | |
| 2002/0063113 A1 | 5/2002 | Wiggermann et al. | |
| 2003/0066821 A1* | 4/2003 | Wybrow | B23K 26/389 219/121.71 |
| 2004/0094524 A1* | 5/2004 | Stevens | B23K 26/389 219/121.71 |
| 2004/0134897 A1 | 7/2004 | Das et al. | |
| 2007/0119832 A1 | 5/2007 | Beck et al. | |
| 2009/0220349 A1 | 9/2009 | Bolms et al. | |
| 2012/0102959 A1* | 5/2012 | Starkweather | F23R 3/04 60/752 |
| 2012/0152917 A1* | 6/2012 | Shaw | B23K 26/388 219/121.71 |
| 2013/0020291 A1* | 1/2013 | Elfizy | B23K 26/388 219/121.71 |
| 2013/0020294 A1* | 1/2013 | Elfizy | B23K 26/389 219/121.71 |
| 2013/0175243 A1 | 7/2013 | Wang | |
| 2013/0269354 A1 | 10/2013 | Starkweather et al. | |
| 2015/0014889 A1 | 1/2015 | Goya et al. | |

FOREIGN PATENT DOCUMENTS

| | | |
|---|---|---|
| CN | 101011780 A | 8/2007 |
| CN | 101374629 A | 2/2009 |
| CN | 102149511 A | 8/2011 |
| CN | 104203483 A | 12/2014 |
| DE | 102004034721 A1 | 2/2006 |
| DE | 102004050047 A1 | 4/2006 |
| EP | 0 826 457 A1 | 3/1998 |
| EP | 1437194 A2 | 7/2004 |
| EP | 1 772 210 A2 | 4/2007 |
| EP | 2168711 A2 | 3/2010 |
| JP | 5-329674 A | 12/1993 |
| JP | 2828871 B2 | 11/1998 |
| JP | 2004-511350 A | 4/2004 |
| JP | 2004-245216 A | 9/2004 |
| JP | 2007-98475 A | 4/2007 |
| JP | 2008-55478 A | 3/2008 |
| JP | 2009-510302 A | 3/2009 |
| JP | 2009-523616 A | 6/2009 |
| JP | 2011-110598 A | 6/2011 |
| JP | 2012-148299 A | 8/2012 |
| JP | 2013-184226 A | 9/2013 |
| KR | 10-2013-0098742 A | 9/2013 |
| WO | WO 01/39920 A1 | 6/2001 |
| WO | WO 02/32614 A1 | 4/2002 |

OTHER PUBLICATIONS

Korean Office Action and English translation, dated Jul. 19, 2017, for Korean Application No. 10-2016-7003704.
Korean Office Action dated Feb. 22, 2018 in corresponding Korean Patent Application No. 10-2016-7003704 with an English Translation.
Extended European Search Report for European Application No. 15755690.3, dated Dec. 23, 2016.
Office Action dated Aug. 3, 2016 issued in corresponding Chinese Patent Application No. 201580001583.2 with an English Translation.
Written Opinion of the International Searching Authority issued in PCT/JP2015/052072 (PCT/ISA/237), dated Apr. 21, 2015.
Notice of Allowance issued in corresponding Japanese Patent Application No. 2014-039643 dated Feb. 23, 2016 with an English translation.
Chinese Office Action and Search Report, dated Jul. 3, 2018 for Chinese Application No. 201580001583.2, with an English translation of the Chinese Office Action.
Feng et al. "Femtosecond Laser Machining of Single-Crystal Superalloys Through Thermal Barrier Coatings", Materials Science & Engineering, A430, pp. 203-207 (2006).
McNally et al. "Laser Drilling of Cooling Holes in Aeroengines: State of the Art and Future Challenges", Materials Science and Technology, vol. 20, pp. 805-813 (2004).
Yarriazaki, "Coherent Industrial All-Solid Pico-Second Laser and Its Uses", Coherent, pp. 1-43 (2015).

* cited by examiner

LASER PROCESSING METHOD AND LASER PROCESSING APPARATUS

TECHNICAL FIELD

The present invention relates to a laser processing method and a laser processing apparatus that perform laser processing.

BACKGROUND ART

As methods and devices that process a processed article, there are laser processing methods and laser processing apparatuses using lasers. For example, PTL 1 describes a laser processing method that irradiates a workpiece with laser beams having at least two types of wavelength to performs hole processing. Specifically, it is described that a laser processing method performs processing through a step of performing irradiation and processing along an inner periphery of a hole with a first laser beam having a spot diameter smaller than the diameter of the hole, and a step of irradiating a portion inside the periphery of the hole with a second laser beam having a spot diameter smaller than the diameter of the hole and a wavelength longer than that of the first laser beam. Additionally, it is described that the portion remaining without being processed in a previous step is processed by the next step. Additionally, PTL 1 describes that a laser beam is radiated while being rotated and a hole is made. Additionally, PTL 2 describes a method of using electromagnetic driving as a mechanism that rotates a laser beam.

CITATION LIST

Patent Literature

[PTL 1] Japanese Unexamined Patent Application Publication No. 2011-110598
[PTL 2] Japanese Patent No. 2828871

SUMMARY OF INVENTION

Technical Problem

Here, as the processed article, there is a structure in which a protection layer made of a material with properties, which are different from a metal layer, is laminated on a metal layer. The protection layer, for example, is laminated on the metal layer as a layer that protects the metal layer from at least one of heat, stress, and contact with foreign matter. When a laminated body in which the protection layer is laminated on such a metal layer is used as a processed article, it is difficult to process the protection layer appropriately, and it is difficult to improve processing speed, with the quality of both the metal layer and the protection layer being maintained.

The invention solves the above-described problems, and an object thereof is to provide a laser processing method and a laser processing apparatus that can process a processed article in which a protection layer is laminated on a metal layer with high quality and with high precision.

Solution to Problem

In order to solve the above-described problems and achieve the above object, the invention provides a laser processing method for processing a processed article using a laser processing head radiating at least a short-pulse laser that processes the processed article. The processed article has a laminated structure in which a protection layer is laminated to a metal layer. The laser processing method includes a short-pulse laser processing step for irradiating the protection layer with the short-pulse laser and ablating the protection layer; and a metal layer processing step for ablating the metal layer in an area ablated in the short-pulse laser processing step.

Additionally, it is preferable that the short-pulse laser processing step ablates the metal layer to a depth of 0.001 mm or more and 50% or less of the thickness of the metal layer in a direction orthogonal to the surface of the metal layer.

Additionally, it is preferable that the short-pulse laser processing step ablates the metal layer to a depth of 0.001 mm or more and 50% or less of the thickness of the metal layer in a direction in which the fiber laser is radiated.

In order to solve the above-described problems and achieve the above object, the invention provides a laser processing method for processing a processed article using a laser processing head radiating at least a laser that processes the processed article. The processed article has a laminated structure in which a protection layer is laminated to a metal layer. The laser processing method includes a metal layer processing step for collectively ablating the protection layer and the metal layer; and a short-pulse laser processing step for irradiating the protection layer including an end surface of an area ablated in the metal layer processing step with a short-pulse laser and ablating the metal layer.

In order to solve the above-described problems and achieve the above object, the invention provides a laser processing method for processing a processed article using a laser processing head radiating at least a laser that processes the processed article. The processed article has a laminated structure in which a protection layer is laminated to a metal layer. The laser processing method includes a metal layer processing step for ablating the metal layer of the processed article in which the protection layer is not formed; a laminating step for laminating the protection layer to the processed article ablated in the metal layer processing step; and a short-pulse laser processing step for irradiating, with a short-pulse laser, an area, which overlaps an area ablated in the metal layer processing step, in the processed article in which the protection layer is laminated in the laminating step, and ablating the metal layer.

Additionally, it is preferable that the short-pulse laser processing step and the metal layer processing step are processing for forming a hole in the processed article, and in the short-pulse laser processing step, a hole, having a larger diameter than a hole to be formed in the metal layer in the metal layer processing step, is formed in the protection layer.

Additionally, it is preferable that, in the metal layer processing step, the area ablated in the short-pulse laser processing step is irradiated with a fiber laser, and ablates the metal layer.

Additionally, it is preferable that the protection layer is formed of a heat-resistant material or a wear-resistant material. Additionally, it is preferable that the protection layer is a thermal barrier coating. Additionally, it is preferable that the protection layer is formed of alumina ($Al_2O_3$), zirconia ($ZrO_2$), titanium oxide ($TiO_2$), Nicral (NiCrAl), Cocral (CoCrAl), alumina titania ($Al_2O_3$—$TiO_2$), chromia ($Cr_2O_3$), chromium carbide ($Cr_3C_2$—NiCr), and tungsten carbide ($Cr_3C_2$—NiCr, $Cr_3C_2$—CoCr, and $Cr_3C_2$—Co).

Additionally, it is preferable that the laser processing head includes a laser turning section that turns the short-pulse laser with respect to the processed article, and a focusing optical system that condenses the short-pulse laser turned by the laser turning section, and in the short-pulse laser processing step, a position where the processed article is irradiated with the laser, is rotated by the laser turning section.

In order to solve the above-described problems and achieve the above object, the invention provides a laser processing apparatus including a stage unit including a stage that supports a processed article; a laser processing unit including a fiber laser light source that outputs a fiber laser, a short-pulse laser light source that outputs a short-pulse laser, and a laser processing head that radiates a laser that processes the processed article; a movable unit including a Y-axis moving mechanism that moves the laser processing head and the stage relative to each other in a Y-axis direction, an X-axis moving mechanism that moves the laser processing head in an X-axis direction relative to the Y-axis moving mechanism, and a Z-axis moving mechanism that is fixed to the X-axis moving mechanism and relatively moves the laser processing head in a Z-axis direction; and a control unit that controls the operation of respective parts. The laser processing head includes a switching mechanism that switches a state where the fiber laser is made to be incident on a laser turning section and a state where the short-pulse laser is made to be incident on the laser turning section, a laser turning section that turns the laser with respect to the processed article, and a focusing optical system that condenses the laser turned by the laser turning section, and a position where the processed article is irradiated with the laser is rotated by the laser turning section.

Here, it is preferable to further include a track adjusting mechanism that is arranged on a path of the short-pulse laser, offsets a radiation position of the short-pulse laser to a position outside the center of a path on which the laser turns, and adjusts the radiation position to a track where the fiber laser is not incident.

Additionally, it is preferable that the track adjusting mechanism is a prism that is installed in the laser turning section.

Additionally, it is preferable that the track adjusting mechanism is a lens that is installed in the focusing optical system.

Additionally, it is preferable to further include a radiation position adjusting mechanism that is arranged on a path of the short-pulse laser and adjusts the radiation position of the short-pulse laser, and it is preferable that the control unit adjusts the radiation position of the short-pulse laser, using the radiation position adjusting mechanism, on the basis of a radiation position of the fiber laser.

Additionally, it is preferable that the processed article has a laminated structure in which a protection layer is formed on a metal layer, and the control unit irradiates the processed article with the short-pulse laser from the laser processing unit, and ablates the protection layer.

Advantageous Effects of Invention

According to the invention, adhesion of dross or generation of cracks can be reduced by ablating the protection layer laminated on the metal layer with the short-pulse laser. Accordingly, effects of these on the protection layer can be reduced, and the precision of processing can be made higher. Additionally, the processing of the metal layer can be performed in a short time by processing the metal layer with processing means different from the short-pulse laser.

DESCRIPTION OF EMBODIMENTS

Figure 1:
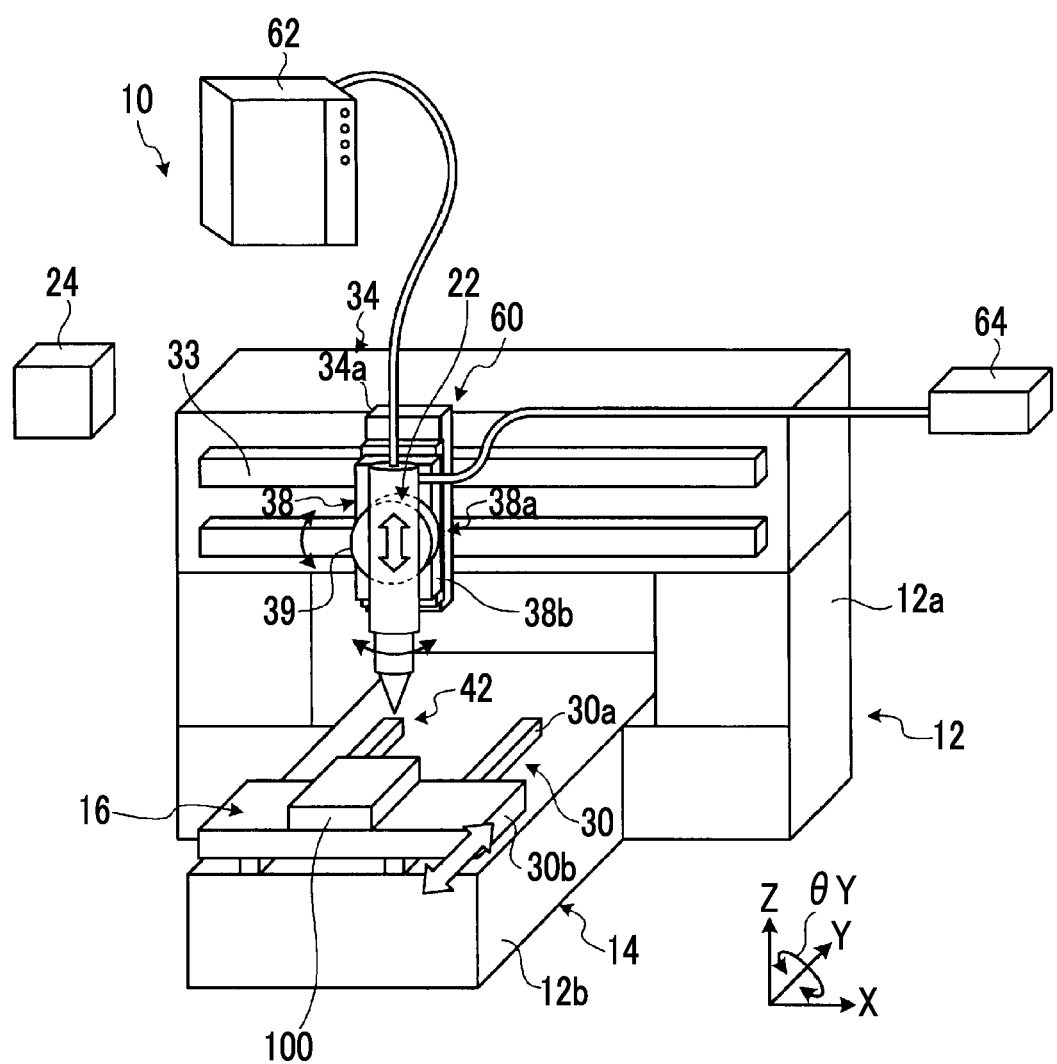
FIG. 1 is a schematic view illustrating a schematic configuration of a laser processing apparatus related to the present embodiment.

Embodiments of the invention will be described in detail referring to the drawings. The invention is not limited by the contents described in the following embodiments. Additionally, constituent elements described hereinbelow include elements generally known to a person skilled in the art, or substantially the same elements. Moreover, configurations described hereinbelow can be appropriately combined. Additionally, various omissions, substitutions, or alterations to the configurations can be made without departing from the concept of the invention.

Figure 2:
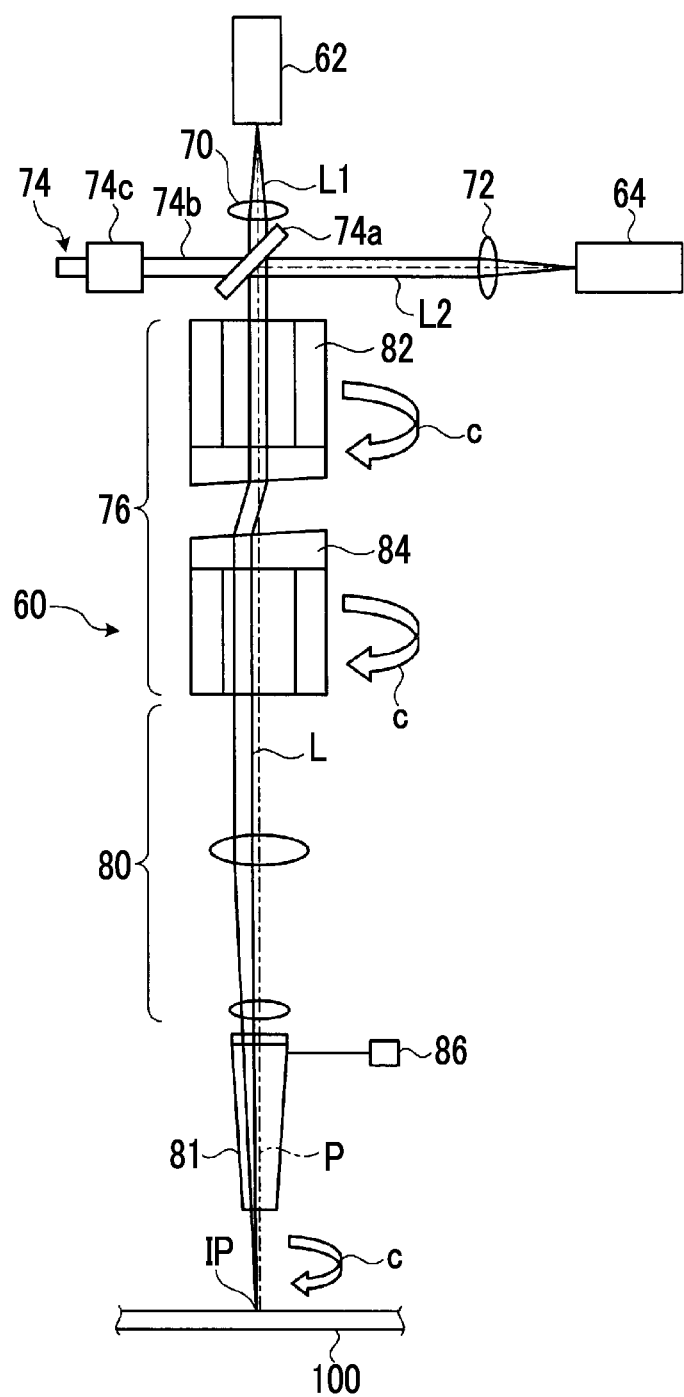
FIG. 2 is a schematic view illustrating a schematic configuration of a laser processing head.

FIG. 1 is a schematic view illustrating a schematic configuration of a laser processing apparatus related to the present embodiment. FIG. 2 is a schematic view illustrating a schematic configuration of a laser processing head. FIGS. 3 to 7 are respectively explanatory views for explaining the operation of the laser processing head.

As illustrated in FIG. 1, the laser processing apparatus 10 is an apparatus that performs various processings, such as cutting processing and hole-making processing, on a processed article 100. In addition, although the type of the processing is not particularly limited, the laser processing apparatus 10 of the present embodiment performs ablation processings, such as hole-making and cutting. Additionally, the laser processing apparatus 10 also performs measurement of the processed article 100.

The laser processing apparatus 10 has a frame 12, a movable unit 14, a stage unit 16, a laser processing unit including a laser processing head 60, and a control unit 24.

The laser processing apparatus 10 irradiates the processed article 100 held by the stage unit 16 with a laser using the laser processing unit 22, and processes the processed article 100 with a laser. Here, in the present embodiment, a horizontal plane is defined as an XY plane including an X-axis direction and a Y-axis direction orthogonal to an X-axis, and a direction orthogonal to the horizontal plane is defined as a Z-axis direction. Additionally, a direction of rotation around the Y-axis is defined as a θY direction.

The frame 12 is a housing of the laser processing apparatus 10, and is fixed to an installation surface, such as the ground or a foundation. The frame 12 has a foundation 12b inserted into a space between a gate 12a and a gate 12a. The frame 12 has a fixing part of the movable unit 14 fixed thereto. The laser processing apparatus 10 is a so-called gate type processing apparatus in which the movable unit 14 is fixed to the gates 12a and the foundation 12b of the frame 12, and the processed article 100 and the laser processing unit 22 are moved relative to each other by the movable unit 14.

The movable unit 14 moves the processed article 100 and the laser processing head 60 relative to each other. The movable unit 14 has a Y-axis moving mechanism 30, an X-axis moving mechanism 34, a Z-axis moving mechanism 38, and a θY rotating mechanism 39. The Y-axis moving mechanism 30 is arranged on the foundation 12b of the frame 12, and has a rail 30a that extends in the Y-axis direction, and a Y-axis moving member 30b that moves along the rail 30a. In the Y-axis moving mechanism 30, the stage unit 16 is fixed to the Y-axis moving member 30b. By moving the Y-axis moving member 30b along the rail 30a, the Y-axis moving mechanism 30 moves the stage unit 16 in the Y-axis direction. The Y-axis moving mechanism 30 is a mechanism that moves the Y-axis moving member 30b in the Y-axis direction, and various mechanisms can be used as this mechanism. For example, a mechanism in which a ball screw is inserted into the Y-axis moving member 30b and the ball screw is rotated by a motor or the like, a linear motor mechanism, a belt mechanism, and the like can be used. As the X-axis moving mechanism 34 and the Z-axis moving mechanism 38, various mechanisms can similarly be used.

The X-axis moving mechanism 34 is arranged on the gate 12a of the frame 12, and has a rail 33 that extends in the X-axis direction, and an X-axis moving member 34a that moves along the rail 33. In the X-axis moving mechanism 34, the Z-axis moving mechanism 38 is fixed to the X-axis moving member 34a. By moving the X-axis moving member 34a along the rail 33, the X-axis moving mechanism 34 moves the Z-axis moving mechanism 38 in the X-axis direction. The Z-axis moving mechanism 38 is fixed to the X-axis moving member 34a, and has a rail 38a that extends in the Z-axis direction, and a Z-axis moving member 38b that moves along the rail 38a. A ηY rotating mechanism 39 is fixed to the Z-axis moving mechanism 38, and the Z-axis moving member 38b is fixed. By moving the ηY rotating mechanism 39 along the rail 38a, the Z-axis moving mechanism 38 moves the ηY rotating mechanism 39 in the Z-axis direction. The ηY rotating mechanism 39 is fixed to the Z-axis moving member 38b, and has the laser processing head 60 fixed thereto. By rotating the laser processing head 60 in the ηY direction with respect to the Z-axis moving member 38b, the ηY rotating mechanism 39 rotates the laser processing head 60 in the ηY direction.

The movable unit 14 moves the processed article 100 and the laser processing head 60 relative to each other in the X-axis direction, the Y-axis direction, and the Z-axis direction, respectively, using the Y-axis moving mechanism 30, the X-axis moving mechanism 34, and the Z-axis moving mechanism 38. Additionally, the movable unit 14 rotates the laser processing head 60 with respect to the processed article 100, using the θY rotating mechanism 39. Accordingly, the orientation of a laser radiated from the laser processing head 60 to the processed article 100 can be adjusted. The movable unit 14 may include a mechanism that rotates the laser processing head 60 around the X-axis. Additionally, the mechanism that adjusts the orientation in which the laser is radiated may be provided at the laser processing head 60.

The stage unit 16 is arranged on the Y-axis moving member 30b of the Y-axis moving mechanism 30. The stage unit 16 is a stage that supports the processed article 100. In the stage unit 16 of the present embodiment, a member integrated with the Y-axis moving member 30b, that is, the Y-axis moving member 30b is a stage of the stage unit 16. However, a separate supporting member may be provided as a stage on the Y-axis moving member 30b. In the stage unit 16, the Y-axis moving mechanism 30 becomes a stage moving mechanism 42 that moves the processed article 100. The stage unit 16 includes a fixing mechanism that fixes the processed article 100 to a predetermined location on the Y-axis moving member 30b. Additionally, the stage unit 16 may further include an adjusting mechanism that adjusts the orientation, that is, posture of the processed article 100 with respect to the Y-axis moving member 30b, in the stage moving mechanism 42. Specifically, a mechanism that rotates the processed article 100 may be included in the stage moving mechanism 42.

The laser processing unit 22 has the laser processing head 60, a fiber laser light source 62, and a short-pulse laser light source 64. The fiber laser light source 62 is a device that outputs a laser with an optical fiber as a medium. As the fiber laser output device, for example, a Fabry-Perot type fiber laser output device or a ring type fiber laser output device can be used, and a laser is oscillated by these output devices being excited. As fibers of the fiber laser output device, for example, silica glass to which rare earth elements, such as erbium (Er), neodymium (Nd), and ytterbium (Yb), are added can be used. The short-pulse laser light source 64 outputs a laser in short pulses, for example, at a frequency of 20 kHz. In the short-pulse laser output device, for example, a titanium sapphire laser can be used as an oscillation source of a laser, and oscillating pulses having a pulse width of 100 picoseconds or less can be produced. Additionally, lasers, such as a YAG laser and a YVO4 laser, which perform nanosecond-order pulse oscillation, can also be used. Here, in the present embodiment, the short-pulse laser outputs a laser in short pulses having a pulse width of 100 nanoseconds or less. In addition, it is preferable that the laser processing unit 22 outputs a short-pulse laser in short pulses having a pulse width of 10 nanoseconds or more, and it is more preferable that the laser processing unit 22 outputs a short-pulse laser as a laser having a pulse width of less than 1 nanosecond.

Next, the laser processing head 60 will be described. The laser processing head 60, as illustrated in FIG. 2, has a fiber laser output from the fiber laser light source 62 and a short-pulse laser output from the short-pulse laser light source 64 incident thereon, and irradiates the processed article 100 with any one of the incident lasers, thereby processing the processed article 100 with the laser. In addition, the fiber laser output from the fiber laser light source 62 and the short-pulse laser output from the short-pulse laser light source 64 are guided to the laser processing head 60 by an optical member, such as an optical fiber, which guides a laser.

The laser processing head 60 includes collimating optical systems 70 and 72, a switching mechanism 74, a laser turning section 76, a focusing optical system 80, and a nozzle 81. The collimating optical system 70 is an optical member that collimates a fiber laser L1 output from the fiber laser light source 62, and emits the collimated fiber laser L1 toward the switching mechanism 74. The collimating optical system 72 is an optical member that collimates a short-pulse laser L2 output from the short-pulse laser light source 64, and emits the collimated short-pulse laser L2 toward the switching mechanism 74.

The switching mechanism 74 is a mechanism that switches whether the fiber laser L1 output from the fiber laser light source 62 is made to be incident on the laser turning section 76 or the short-pulse laser L2 output from the short-pulse laser light source 64 is made to be incident. The switching mechanism 74 has a mirror 74a that reflects a laser, a support rod 74b that is coupled to the mirror 74a, and a driving part 74c that moves the support rod 74b. The switching mechanism 74 arranges the mirror 74a at a position illustrated in FIG. 2, specifically, at a position where the fiber laser L1 and the short-pulse laser L2 overlap each other, using the driving part 74c. Specifically, the mirror 74a is arranged at a position where the short-pulse laser L2 having passed through the collimating optical system 72 arrives, between the collimating optical system 70 and the laser turning section 76.

Figure 3:
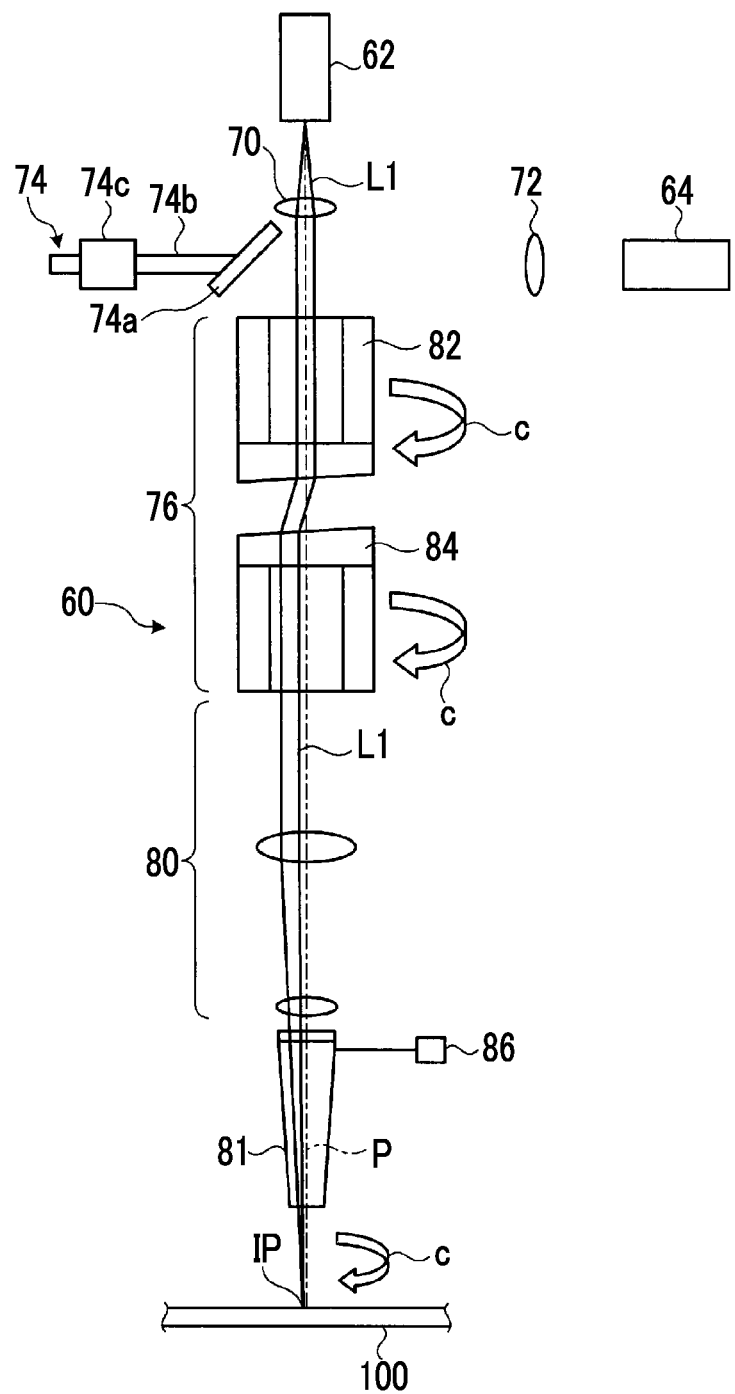
FIG. 3 is an explanatory view for explaining the operation of the laser processing head.

Additionally, the switching mechanism 74, as illustrated in FIG. 3, brings about a state where the mirror 74a is arranged at a position shifted from a path for the fiber laser L1, that is, the mirror 74a is not arranged at the position where the fiber laser L1 and the short-pulse laser L2 overlap each other, using the driving part 74c, and brings about a state where the fiber laser L1 is made to be incident on the laser turning section 76 by allowing the fiber laser L1 to pass therethrough as it is. When the fiber laser L1 passes as it is, the laser L2 may be reflected by a mirror so as to be radiated to a position where the laser is absorbed, or a shutter may be provided between the collimating optical system 72 and the mirror 74a so as to shield a laser. In an example illustrated in FIG. 3, since the short-pulse laser L2 is shielded by the short-pulse laser light source 64, the short-pulse laser L2 does not reach the mirror 74a.

Figure 4:
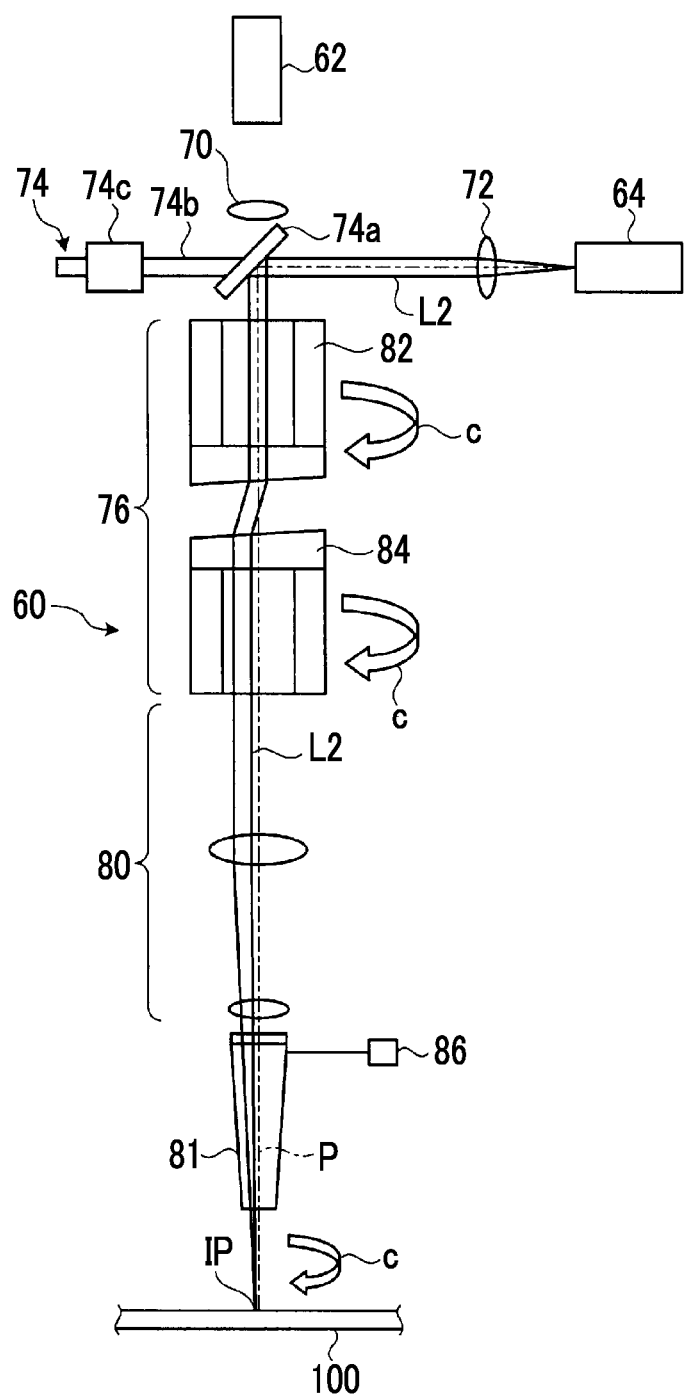
FIG. 4 is an explanatory view for explaining the operation of the laser processing head.

The switching mechanism 74, as illustrated in FIG. 4, brings about a state where the mirror 74a is arranged at the position where the fiber laser L1 and the short-pulse laser L2 overlap each other, using the driving part 74c, and the short-pulse laser L2 is made to be incident on the laser turning section 76 by reflecting the short-pulse laser L2 with the mirror 74a and shielding the fiber laser L1. In addition, in an example illustrated in FIG. 4, since the fiber laser L1 is shielded by the fiber laser light source 62, the fiber laser L1 does not hit the mirror 74a.

The laser turning section 76 rotates a laser around the center of a light path (for example, arrow c in the drawing), and turns a radiation position IP of a laser to be radiated to the processed article 100, that is, a laser L in the same direction. The laser turning section 76, as illustrated in FIG. 2, has a first prism unit 82 and a second prism unit 84.

The first prism unit 82 has a first prism that refracts the laser L and tilts the laser with respect to the optical axis, and a rotating mechanism that rotates the first prism. The second prism unit 84 has a second prism that refracts the laser refracted by the first prism unit 82 again and controls a focusing position, and a rotating mechanism that rotates the second prism. As the first prism and the second prism, for example, wedge prisms can be used.

Figure 5:
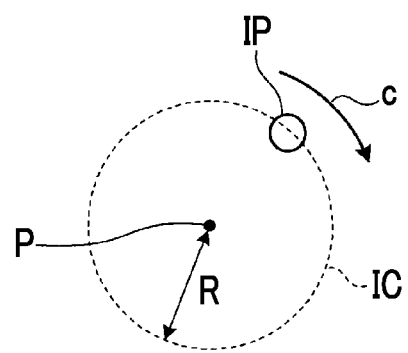
FIG. 5 is an explanatory view for explaining the operation of the laser processing head.

By rotating the first prism of the first prism unit 82 and the second prism of the second prism unit 84, as illustrated in FIG. 5, the laser turning section 76 rotates the radiation position of a laser. The laser turning section 76 is capable of synchronously rotating and rotating the first prism of the first prism unit 82 and the second prism of the second prism unit 84 relative to each other.

Additionally, the laser turning section 76 can change a difference in phase angle between the first prism of the first prism unit 82 and the second prism of the second prism unit 84. Accordingly, as illustrated in FIG. 5, a laser irradiation point can be eccentrically formed at the radiation position IP at a distance corresponding to the difference in phase angle between the first prism and the second prism from the center P of the light path as a rotational axis. That is, the laser turning section 76 may synchronously rotate the first prism of the first prism unit 82 and the second prism of the second prism unit 84 with the same rotation cycle while maintaining the difference in phase angle between the first prism and the second prism, whereby the laser irradiation point draws a circular track IC of a turning radius R. Additionally, when the first prism of the first prism unit 82 and the second prism of the second prism unit 84 are asynchronously rotated (rotated with different rotation cycles), the laser irradiation point can be turned while increasing or decreasing the turning radius of the laser irradiation point, and it is also possible to draw arbitrary curvilinear tracks.

Additionally, the turning radius R means the distance from the center of the light path to the radiation position of a laser radiated to the processed article 100, and means a radius with which a laser radiated to the processed article 100 is turned around the center. Since the turning radius R of the laser radiated to the processed article 100 is changed by changing the difference in phase angle between the first prism and the second prism, the turning radius R is variable. The frequency of turning means the number of times the radiation position of a laser radiated to the processed article 100 is turned around the center per unit time.

The focusing optical system 80 has a plurality of lenses, and the plurality of lenses condense a laser having passed through the laser turning section 76 and form a laser with a predetermined focal distance and a predetermined depth of focus. The focusing optical system irradiates the processed article 100 with a laser having a predetermined spot diameter. Additionally, it is preferable that the focusing optical system 80 has a cooling mechanism. The cooling mechanism is, for example, a cooling jacket or the like for cooling the plurality of lenses.

The nozzle 81 has a hollow conical shape of which a diameter decreases gradually as it becomes close to the end side in the traveling direction of the laser L. The nozzle 81 is mounted on the focusing optical system 80. The nozzle 81 has a translucent member for preventing the focusing optical system 80 from being soiled due to spattering or the like caused at a processing point of the processed article 100. Additionally, the nozzle 81 has assist gas supplied thereto from an assist gas supply source 86, and is capable of jetting this assist gas toward the processed article 100.

In the present embodiment, for example, air, nitrogen gas, oxygen gas, argon gas, xenon gas, helium gas, or mixed gases thereof can be used as the assist gas. When oxygen gas with which oxidation reaction heat for processing can be used for processing is used as the assist gas, the processing speed of the processed article 100 such as a metal, can be further improved. Additionally, when nitrogen gas, argon gas, or the like, which suppresses generation of an oxide layer as a heat-affected layer, is used as the assist gas, the processing precision of the processed article 100, such as metal, can be further improved. The gas type and the percentage contents of the assist gas, the amount of jetting (pressure) of the assist gas from the nozzle 81, or the like can be changed according to processing conditions, such as the type of processed article 100, and processing modes.

Additionally, the laser processing unit 22 may include photographing means for capturing an image at a position where a laser is radiated, for example, a camera having a charge coupled device (CCD) image sensor or the like. Accordingly, the radiation position of a laser, or the like can be adjusted on the basis of the acquired image.

Figure 6:
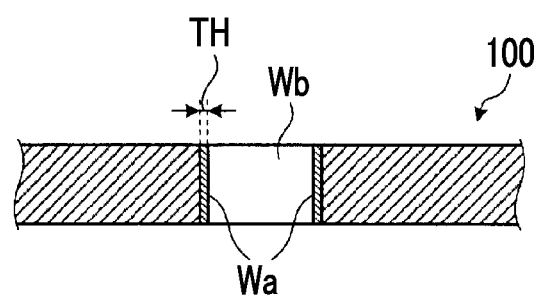
FIG. 6 is an explanatory view for explaining the operation of the laser processing head.

The laser processing unit 22 irradiates the processed article 100 from the laser processing head 60 with a laser output from the fiber laser light source 62 or the short-pulse laser light source 64, thereby making a hole Wb. Although FIG. 6 illustrates a case where hole-making is performed, the radiation position of a laser is moved, so that a processed article can be ablated in a line and a processed article can also be cut. When the laser processing unit 22 performs processing by radiating a laser, the heat-affected layer Wa is formed around a processed hole Wb. In the present embodiment, the thickness of the heat-affected layer Wa is TH.

The control unit 24 controls the operation of respective parts of the movable unit 14, the stage unit 16, and the laser processing unit 22. The control unit 24 controls the operation of the movable unit 14 and the stage moving mechanism 42 of the stage unit 16, and moves the processed article 100 and the laser processing head 60 relative to each other. Additionally, the control unit 24 controls the driving of the laser processing unit 22, and controls laser processing. Specifically, the control unit 24 determines whether processing is performed with a fiber laser or processing is performed with a short-pulse laser on the basis of a processing procedure of the processed article 100, operates the respective parts including the switching mechanism 74 on the basis of the determination, and irradiates the processed article 100 with a laser. Additionally, the control unit 24 refers to a control map (turning condition control map) in which the correlation between the thickness of the heat-affected layer Wa, the turning frequency of the laser L, and the turning radius R is determined on the basis of the allowable thickness of the heat-affected layer Wa, and determines the allowable range of turning frequency range and allowable turning radius range of the laser L in which the thickness TH of the heat-affected layer Wa does not exceed the allowable thickness.

Here, in the present embodiment, the heat-affected layer Wa of the processed article 100 includes at least one of a remelted layer, an oxidation layer, cracks, and dross that are formed by the laser L (any one laser of the fiber laser L1 and the short-pulse laser L2) radiated to the processed article 100. The remelted layer is a layer where the solid of the processed article 100 is liquefied due to the radiation of the laser L and solidifies again, at the time of processing. Although the remelted layer varies depending on the processing mode, the remelted layer is not a layer formed at the end in the irradiation direction (traveling direction) of the laser L but a layer formed in a direction orthogonal to the irradiation direction (traveling direction) of the laser L in the case of the hole making processing or cutting processing, and is formed in an inner peripheral surface of the hole Wb formed by radiating the laser L and a cutting surface of the cut processed article 100.

The oxidation layer is an oxide layer that is formed on the inner peripheral surface of the hole Wb of the processed article 100 or the cutting surface of the processed article when the processed article 100 is metal or the like and oxygen is used as the assist gas. The processed article 100 is rapidly heated due to the radiation of the laser L, and the cracks are fine cracks (microcracks) that are generated on the inner peripheral surface of the hole Wb of the processed article 100 or the cutting surface of the processed article, at the time of this rapid heating. The dross is extraneous matter obtained when a liquefied material becomes a molten material at the time of the hole making, cutting, or the like of the processed article 100 and adheres to and solidifies on the inner peripheral surface of the hole Wb of the processed article 100 or the cutting surface of the processed article. The thickness TH of the heat-affected layer Wa of the processed article 100 includes the thickness of the remelted layer, the thickness of the oxide layer, and the depth of the cracks and the thickness of the extraneous matter.

The allowable thickness is a thickness within a range where the thickness TH of the heat-affected layer Wa in the inner peripheral surface of the hole Wb or a cut portion is allowable in the processed article 100 as a product subjected to processing when ablation processing including at least one of cutting processing and hole making processing is performed on the processed article 100. Additionally, although the allowable thickness varies depending on the processing mode, the allowable thickness is a length in the direction orthogonal to the irradiation direction (traveling direction) of the laser L in the case of the hole making processing or cutting processing.

Figure 7:
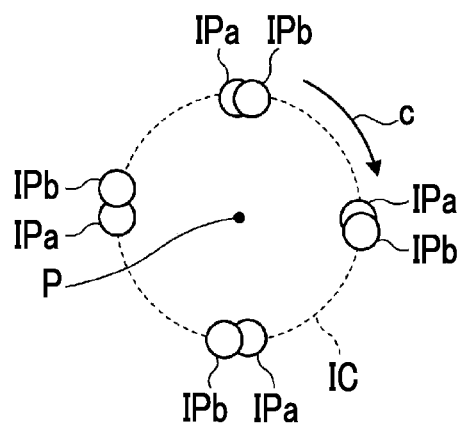
FIG. 7 is an explanatory view for explaining the operation of the laser processing head.

Additionally, when the laser processing apparatus 10 is turned on/off in a fixed cycle when irradiating the processed article 100 with the laser L, for example, when processing is performed with a short-pulse laser, as illustrated in FIG. 7, it is preferable that the ON/OFF period of the laser is a non-integer multiple of the turning period of the radiation position. That is, by shifting the ON/OFF period of the laser L and the turning period of the radiation position IP, the laser processing apparatus 10 can irradiate a radiation position IPa in a first cycle and can irradiate a radiation position IPb in a second cycle. That is, the laser processing apparatus 10 can shift radiation positions sequentially by repeating ON/OFF of the laser L similarly in the third and subsequent cycles. Accordingly, the radiation positions of the laser L are shifted from each other in the respective cycles, and the laser processing apparatus 10 can efficiently irradiate a processed area of the processed article 100 with the laser L.

Additionally, the laser processing apparatus 10 can irradiate the processed article 100 with the laser L in a spiral track gradually moving away from the center P when the first prism of the first prism unit 82 and the second prism of the second prism unit 84 are rotated while continuously changing the difference in phase angle between the first prism of the first prism unit 82 and the second prism of the second prism unit 84. Accordingly, the laser processing apparatus 10 can also irradiate the laser L spirally, thereby processing a processed article 100 having a thickness such that it is difficult for the laser L to be incident thereon.

Figure 8:
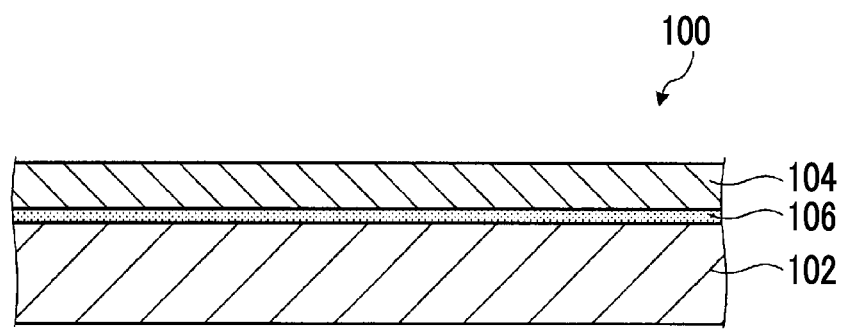
FIG. 8 is a schematic view illustrating an example of the structure of a processed article.
Figure 9:
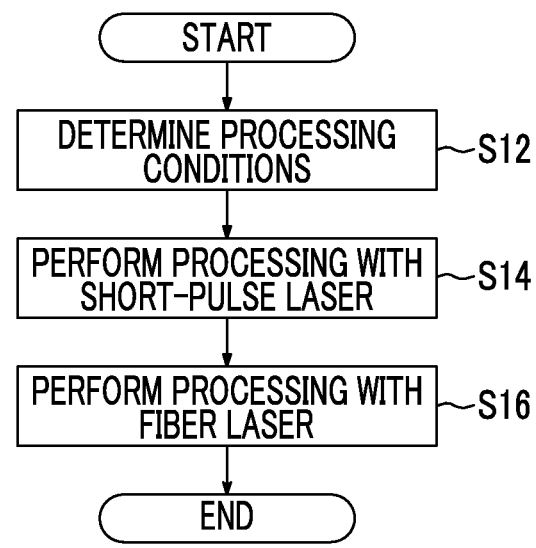
FIG. 9 is a flowchart for explaining the operation of the laser processing apparatus.
Figure 10A:
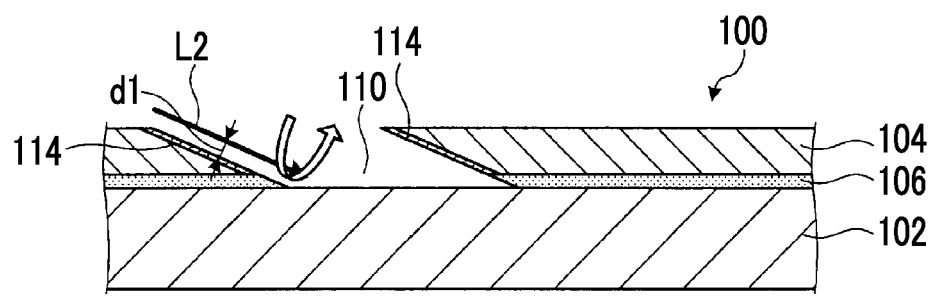
FIG. 10A is an explanatory view for explaining the operation of the laser processing apparatus.
Figure 10B:
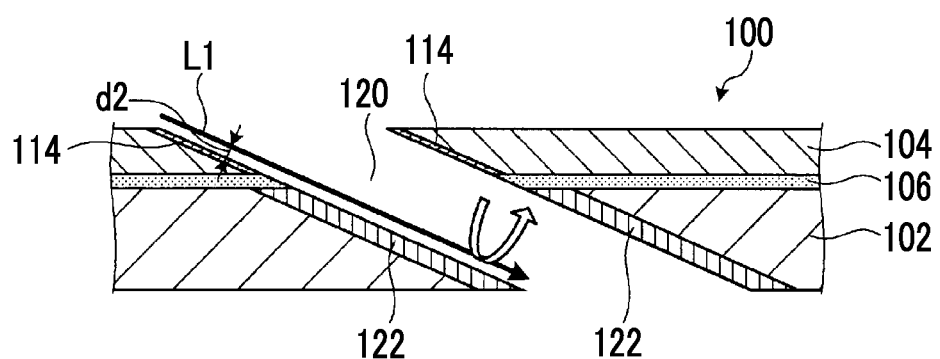
FIG. 10B is an explanatory view for explaining the operation of the laser processing apparatus.
Figure 11:
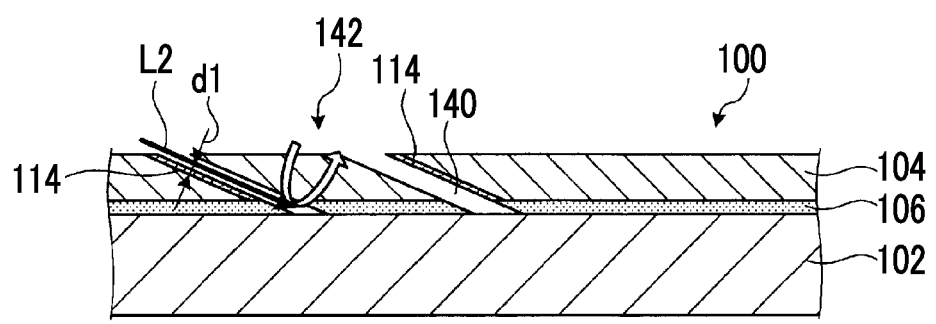
FIG. 11 is an explanatory view for explaining the operation of the laser processing apparatus.
Figure 12A:
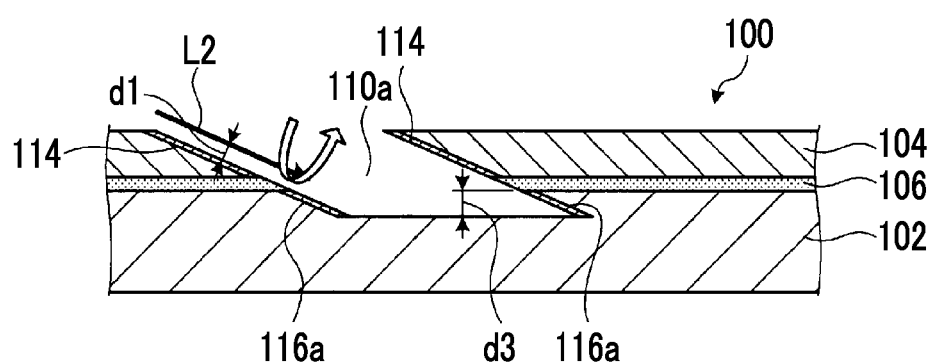
FIG. 12A is an explanatory view for explaining the operation of the laser processing apparatus.
Figure 12B:
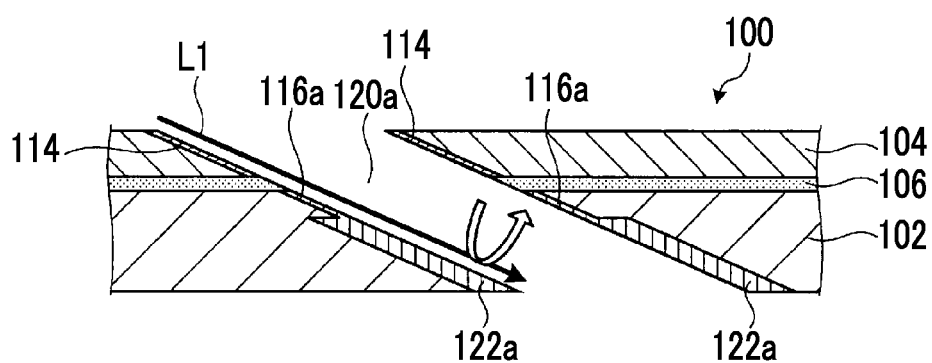
FIG. 12B is an explanatory view for explaining the operation of the laser processing apparatus.
Figure 13:
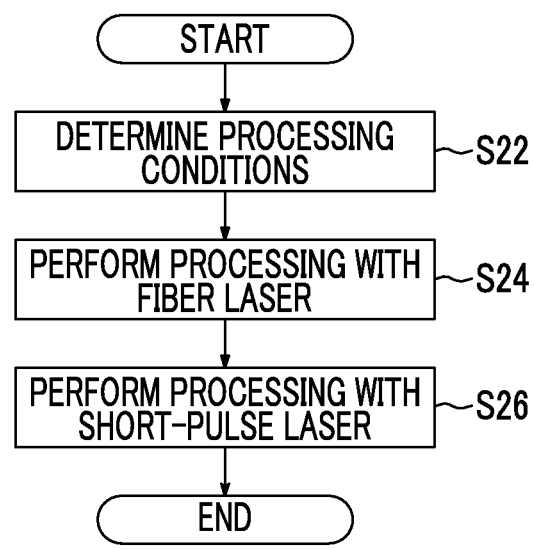
FIG. 13 is a flowchart for explaining the operation of the laser processing apparatus.
Figure 14A:
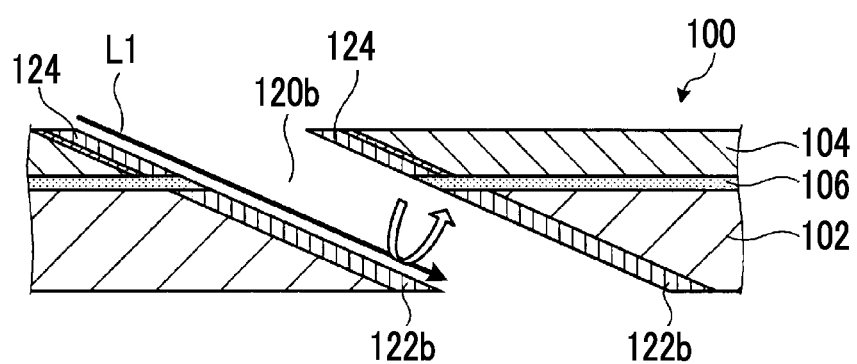
FIG. 14A is an explanatory view for explaining the operation of the laser processing apparatus.
Figure 14B:
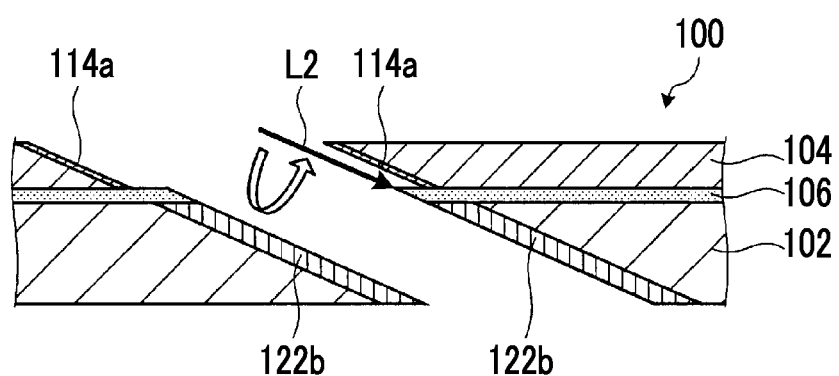
FIG. 14B is an explanatory view for explaining the operation of the laser processing apparatus.
Figure 15:
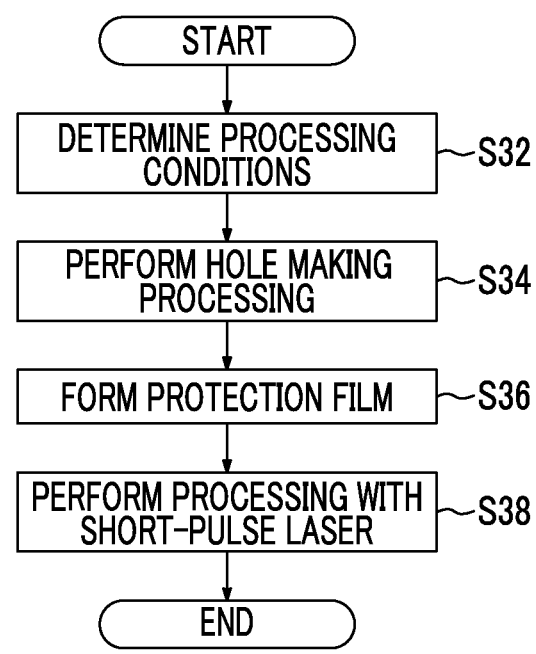
FIG. 15 is a flowchart for explaining the operation of the laser processing apparatus.
Figure 16:
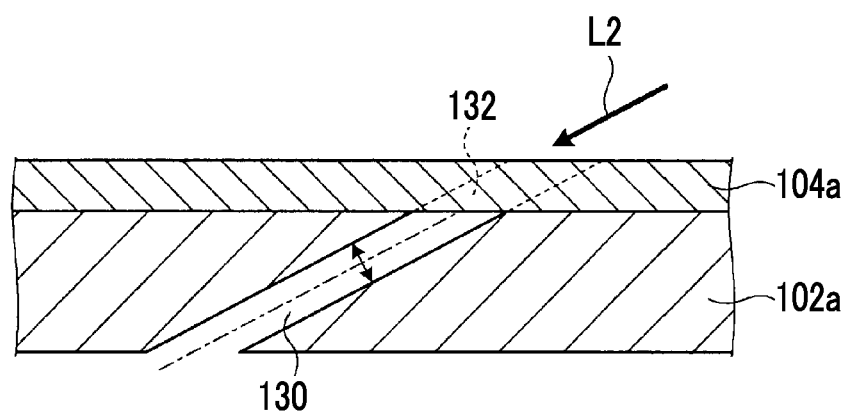
FIG. 16 is an explanatory view for explaining the operation of the laser processing apparatus.

Next, the operation of the laser processing apparatus 10, that is, an example of a laser processing method will be described with reference to FIGS. 8 to 16. FIG. 8 is a schematic view illustrating an example of the structure of the processed article. FIG. 9 is a flowchart for explaining the operation of the laser processing apparatus. FIGS. 10A and 10B are explanatory views for explaining the operation of the laser processing apparatus, respectively. FIG. 11 is an explanatory view for explaining the operation of the laser processing apparatus. FIGS. 12A and 12B are explanatory views for explaining the operation of the laser processing apparatus, respectively. FIG. 13 is a flowchart for explaining the operation of the laser processing apparatus. FIGS. 14A and 14B are explanatory views for explaining the operation of the laser processing apparatus, respectively. FIG. 15 is a flowchart for explaining the operation of the laser processing apparatus. FIG. 16 is an explanatory view for explaining the operation of the laser processing apparatus.

First, the structure of the processed article 100 will be described with reference to FIG. 8. In the processed article 100, a protection layer 104 is laminated on a metal layer 102. The protection layer 104 is a layer that protects the metal layer 102 from at least one of heat, stress, and contact with foreign matter. It is preferable that the protection layer 104 is formed of heat-resistant materials or wear-resistant materials. Here, as the heat-resistant materials or the wear-resistant materials, more specifically, it is preferable to use alumina ($Al_2O_3$), zirconia ($ZrO_2$), titanium oxide ($TiO_2$), Nicral (NiCrAl), Cocral (CoCrAl), alumina titania ($Al_2O_3$—$TiO_2$), chromia ($Cr_2O_3$), chromium carbide ($Cr_3C_2$—NiCr), or tungsten carbide ($Cr_3C_2$—NiCr, $Cr_3C_2$—CoCr, and $Cr_3C_2$—Co) for the protection layer 104. By using the above materials, at least one of heat resistance and wear resistance can be made high. Additionally, an adhesive layer 106 that joins the metal layer 102 and the protection layer 104 is formed between the metal layer 102 and the protection layer 104. In addition, the adhesive layer 106 may not be provided when the protection layer 104 can be directly formed on the metal layer 102.

A turbine blade is exemplified as the processed article 100. In the case of a turbine blade, the protection layer 104 serving as thermal barrier coating (TBC) is formed on the surface of the metal layer 102 formed of heat-resistant steel by thermal spraying or the like. The protection layer 104 is a film that contributes to an improvement in the heat resistance of the turbine blade. Additionally, when the processed article 100 is a turbine blade, the laser processing apparatus 10 forms a through-hole as a cooling hole for film cooling in the metal layer 102 and the protection layer 104 of the turbine blade. Additionally, although a turbine blade has been illustrated as an example of the processed article 100, the processed article is not limited to this. As the processed article 100, various members in which the protection layer 104 is laminated on the metal layer 102 can be exemplified. For example, similar to a turbine blade, there is an engine combustor as a portion in which a thermal-spraying film serving as the protection layer 104 is formed on the surface of heat-resistant steel serving as the metal layer 102.

Next, an example of the laser processing method will be described with reference to FIG. 9. The laser processing apparatus 10 determines processing conditions (Step S12). Specifically, a processing time, the rotating speed of a laser, the output of a laser, and the like are determined on the basis of respective thicknesses and materials, and the like of the metal layer 102 and the protection layer 104 of the processed article 100.

The laser processing apparatus 10 performs processing with a short-pulse laser if the processing conditions have been determined (Step S14). Specifically, the laser processing apparatus 10 brings about a state where the processed article 100 is irradiated with the short-pulse laser L2 radiated from the short-pulse laser light source 64, using the switching mechanism 74, irradiates the processed article 100 with the short-pulse laser L2, and performs ablation of the processed article 100. The laser processing apparatus 10 ablates the protection layer 104 of the processed article 100 with the short-pulse laser L2. Accordingly, as illustrated in FIG. 10A, a hole 110 is formed in the protection layer 104 of the processed article 100. Additionally, a heat-affected layer 114 is formed around the hole 110. The heat-affected layer 114 is formed in an area radially outside the hole 110 from a wall surface of the hole 110 due to irradiation with the short-pulse laser L2. Here, the laser processing apparatus 10 irradiates an area in the inside of the hole 110 with the short-pulse laser L2. When the diameter of the short-pulse laser L2 is 1 mm, the distance d1 between an end surface of the short-pulse laser L2 and an ablated side surface becomes 0.5 mm (the distance between the center of the short-pulse laser L2 and the ablated side surface is 1.0 mm). It is preferable that d1 is 0.001 mm or more and 1 mm or less.

If the laser processing apparatus 10 has performed processing with a short-pulse laser, processing is performed with a fiber laser (Step S16). Specifically, the laser processing apparatus 10 brings about a state where the processed article 110 is irradiated with the fiber laser L1 radiated from the fiber laser light source 62, using the switching mechanism 74, irradiates the area where the hole 110 of the processed article 100 has been formed with the fiber laser L1, and performs ablation of the processed article 100. The laser processing apparatus ablates the metal layer 102 of the processed article 100 with the fiber laser L1. Accordingly, as illustrated in FIG. 10B, a hole 120 connected to the protection layer 104 and the metal layer 102 of the processed article 100 is formed. Additionally, a heat-affected layer 122 is formed in the portion of the metal layer 102 around the hole 120. The heat-affected layer 122 is formed in an area radially outside the hole 120 from the wall surface of the hole 120 in the portion of the metal layer 102 due to irradiation with the fiber laser L1. Here, the laser processing apparatus 10 irradiates an area in the inside of the hole 120 with the fiber laser L1. When the diameter of the fiber laser L1 is 1 mm, the distance d2 between an end surface of the fiber laser L1 and an ablated side surface becomes 0.5 mm (the distance between the center of the fiber laser L1 and the ablated side surface is 1.0 mm). It is preferable that d2 is 0.01 mm or more and 2 mm or less. By providing the distance d2 between the fiber laser L1 and the side surface ablated with the fiber laser L1, the laser processing apparatus 10 can ablate the metal layer 102 in a state where the fiber laser L1 does not hit the wall surface (heat-affected layer 114) of the protection layer 104 processed with the short-pulse laser L2. The laser processing apparatus 10 ends main processing if processing has been performed with a fiber laser.

The laser processing apparatus 10 can ablate the protection layer 104 with a short-pulse laser, thereby making the heat-affected layer 114 generated on the protection layer 104 smaller. Additionally, the laser processing apparatus 10 can ablate the metal layer 102 with a fiber laser, thereby shortening the time for ablating the metal layer 102. Accordingly, the laser processing apparatus 10 can make the heat-affected layer 114 of the protection layer 104 small and can perform processing of the processed article 100 with high precision at a high speed while preventing the processing time of the processed article 100 from becoming long.

For example, in the case of the structure in which the protection layer (TBC) 104 is formed on the metal layer (heat-resistant steel) 102 by methods, such as thermal spraying, like the turbine blade of the above-described gas turbine, a composite material is used. Therefore, it is difficult to perform high-quality processing in contrast to a case in which there is only the heat-resistant steel. Specifically, in the metal layer 102 and the protection layer 104, suitable processing conditions are different. Therefore, if suitable conditions are set for processing of any one of the layers, the quality of the other layer deteriorates. Additionally, in the TBC and the heat-resistant steel, the coefficients of thermal expansion with respect to heat input are different. As a result, heat-affected layers, such as those with cracks, are apt to be generated in the TBC. As for the surface of the TBC, compared to the heat-resistant steel, surface roughness is greater, and dross is more apt to adhere to the surface, that is, a heat-affected layer is apt to becomes larger. In contrast, the laser processing apparatus 10 can ablate the protection layer 104 with a short-pulse laser, thereby performing cutting processing while making a heat-affected layer small.

Additionally, the laser processing apparatus 10 can perform processing of the metal layer 102 with a fiber laser, thereby performing the processing of the metal layer 102 in a short time.

As described above, by providing the fiber laser light source 62 and the short-pulse laser light source 64 and allowing lasers to be radiated to be switched by the switching mechanism 74, the laser processing apparatus 10 can switch lasers to be used, according to the size, thickness, material, and the like of the processed article 100. Accordingly, processing can be performed in a short time with high precision according to applications.

Additionally, the laser processing apparatus 10 can make a heat-affected layer small, thereby allowing smaller tolerances (tolerances for performance, shape, and the like in which error or the like is taken into consideration) to be applied to a cutting surface, a hole, and the like at the time of design. Accordingly, the performance of the processed article 100 can be made higher by performing processing with the laser processing apparatus 10.

Here, the laser processing apparatus 10 irradiates an area in the inside of the hole 120 with the fiber laser L1, thereby processing the metal layer 102 in a state where the fiber laser L1 does not hit the protection layer 104. Accordingly, the laser processing apparatus 10 can prevent the heat-affected layer 114 of the protection layer 104 from becoming larger at the time of the radiation of the fiber laser L1.

Additionally, the laser processing apparatus 10 can perform processing using a fiber laser and processing using a short-pulse laser with one laser processing unit 22. Accordingly, with the fixed state of the processed article 100 maintained, processing can be performed, and an axial gap can be prevented from occurring in a processed portion. Additionally, laser processing can be effectively performed by rotating a laser.

Additionally, by switching lasers to be incident on the laser turning section 76, using the switching mechanism 74, the laser processing apparatus 10 can cause the respective lasers to be suitably incident on the laser turning section 76 even when the wavelengths of a fiber laser and a short-pulse laser are near each other. Specifically, losses caused in both a fiber laser and a short-pulse laser can be reduced by the movement of the laser processing head 60, and the processed article 100 can be efficiently irradiated with lasers output from light sources.

Additionally, in the above embodiment, a hole formed in the protection layer 104 and a hole formed in the metal layer 102 are made to have the same size (the same diameter). However, the invention is not limited to this. It is preferable that the laser processing apparatus 10 forms a hole formed in the protection layer 104 with a larger diameter than the hole formed in the metal layer 102. Specifically, in a short-pulse laser processing step, it is more preferable that a metal layer processing step forms a hole, having a larger diameter than the hole formed in the metal layer 102, in the protection layer 104. Here, it is more preferable that the laser processing apparatus 10 makes the diameter of the hole formed in the protection layer 104 10 μm larger than the diameter of the hole formed in the metal layer 102 by several tens of micrometers. Accordingly, a heat-affected layer generated in the protection layer 104 at the time of processing can be more reliably made smaller. In addition, in the present embodiment, a case where a hole is formed in the processed article 100 by processing has been described. However, in the case of processing in which a laser is linearly moved and the processed article 100 is cut, similarly, it is preferable that the protection layer 104 is processed over a wider area than the metal layer 102 as viewed from a surface.

Here, in an example illustrated in FIG. 10A, a hole is formed in the protection layer 104 with the short-pulse laser L2. However, the invention is not limited to this. The laser processing apparatus 10 may ablate only a portion serving as an inner surface of the hole of the protection layer 104 of the processed article 100 with the short-pulse laser L2. Specifically, the processing for forming a ring-shaped hole in a protection layer may be performed with the short-pulse laser L2.

FIG. 11 is an explanatory view for explaining the operation of the laser processing apparatus. The laser processing apparatus 10, as illustrated in FIG. 11, may form a ring-shaped opening 140 in the protection layer 104 with the short-pulse laser L2. The external diameter (of a portion furthest from a rotation center) of the opening 140 becomes an external diameter of a hole to be formed. The shape of the opening 140 on the external diameter side has the same shape as the hole 110 of FIG. 10A. Additionally, as illustrated in FIG. 11, the laser processing apparatus 10 brings about a state where a column 142 of the protection layer 104 has remained inside the opening 140 by forming the ring-shaped opening 140 in the protection layer 104 with the short-pulse laser L2. After the opening 140 is formed with the short-pulse laser L2, the laser processing apparatus 10 performs the processing of ablating a portion of the metal layer 102, and the column 142 with the fiber laser L1, and forms the hole 120 illustrated in FIG. 10B.

The laser processing apparatus 10, as illustrated in FIG. 11, can process the ring-shaped opening 140 with the short-pulse laser L2, selectively process an inner wall surface portion of the protection layer 104 of the hole 120, and process the column 142 with the fiber laser L1, thereby further shortening the time for processing performed with the short-pulse laser L2. Additionally, since the column 142 is separated from an inner periphery of the hole 120, the column can be ablated with the fiber laser L1 without influencing the inner periphery of the hole 120, and the quality of the hole 120 can be maintained.

Additionally, in the example illustrated in FIGS. 10A and 10B and an example illustrated in FIG. 11, processing can be performed in a shorter time. Therefore, only the protection layer 104 is processed with the short-pulse laser L2. However, the invention is not limited to this. The laser processing apparatus 10 may ablate portions of the protection layer 104 and the metal layer 102 of the processed article 100 with the short-pulse laser L2. Specifically, thin layer processing of the metal layer 102 may be performed.

For example, the laser processing apparatus 10 may ablate portions of the protection layer 104 and the metal layer 102 of the processed article 100 with the short-pulse laser L2. Accordingly, as illustrated in FIG. 12A, a hole 110*a* that extends to a portion of the metal layer 102 on the protection layer 104 side is formed in addition to the protection layer 104 of the processed article 100. Additionally, heat-affected layers 114 and 116*a* are formed around the hole 110*a*. The heat-affected layer 114 is formed in an area radially outside the hole 110*a* from a wall surface of the hole 110*a* of the protection layer 104 due to irradiation with the short-pulse laser L2. The heat-affected layer 116*a* is formed in an area radially outside the hole 110*a* from the wall surface of the hole 110*a* of the metal layer 102 due to irradiation with the short-pulse laser L2. Here, the laser processing apparatus 10 irradiates an area in the inside of the hole 110*a* with the short-pulse laser L2. Additionally, in the laser processing apparatus 10, the depth of the hole 110*a* in the metal layer 102 becomes d3.

When the hole 110*a* has been formed with the short-pulse laser L2, the laser processing apparatus 10 brings about a state where the processed article 100 is irradiated with the fiber laser L1 radiated from the fiber laser light source 62, using the switching mechanism 74, irradiates the area where the hole 110*a* of the processed article 100 has been formed with the fiber laser L1, and performs ablation of the processed article 100. The laser processing apparatus 10 ablates the metal layer 102 of the processed article 100 with the fiber laser L1. Accordingly, as illustrated in FIG. 12B, a hole 120*a* connected to the protection layer 104 and the metal layer 102 of the processed article 100 is formed. Additionally, a heat-affected layer 122*a* is formed in the portion of the metal layer 102 around the hole 120*a*. The heat-affected layer 122*a* is formed in an area radially outside the hole 120*a* from the wall surface of the hole 120*a* in the portion of the metal layer 102 due to irradiation with the fiber laser L1. The heat-affected layer 122*a* is adjacent to the heat-affected layer 116*a*. That is, the metal layer 102 has the heat-affected layer 116*a* formed on the protection layer 104 side, and has the heat-affected layer 122*a* formed opposite to the protection layer 104 side.

The laser processing apparatus 10 can form the hole 110*a* also in a portion of the metal layer 102 with the short-pulse laser L2 and irradiate the metal layer 102 with the fiber laser L1, thereby preventing heat effects caused in the metal layer 102 from being transmitted to a protection layer. Accordingly, the heat-affected layer 114 processed and generated with the short-pulse laser L2 can be prevented from becoming large due to the radiation of the fiber laser L1.

Additionally, in the laser processing apparatus 10, it is preferable that the depth d3 of the hole 110*a* in the metal layer 102 is 0.001 mm or more and is 50% or less of the thickness of the metal layer 102. That is, it is preferable to ablate the metal layer 102 to a depth of 0.001 mm or more and 50% or less of the thickness of the metal layer 102 in a direction orthogonal to the surface of the metal layer 102. By setting the depth d3 to the above depth, effects on the protection layer 104 to be generated can be made smaller by the metal layer 102 being irradiated and processed with the fiber laser L1.

Additionally, in the laser processing apparatus 10, it is preferable that the depth (the depth of a hole in the traveling direction of a laser) of a hole of a metal layer, which is formed due to the radiation of a pulse laser, in a direction in which a laser is radiated, is a depth of 0.001 mm or more and 50% or less of the thickness of the metal layer. Here, it is preferable that the angle formed between the direction in which the laser is radiated and the direction orthogonal to the surface of a processed article is 10 degrees or more and 60 degrees or less. Accordingly, effects on the protection layer 104 to be generated can be made smaller by the metal layer 102 being irradiated and processed with the fiber laser L1.

Next, an example of the laser processing method will be described with reference to FIG. 13. The laser processing apparatus 10 determines processing conditions (Step S22). Specifically, the processing time, the rotating speed of a laser, the output of a laser, and the like are determined on the basis of respective thicknesses and materials, and the like of the metal layer 102 and the protection layer 104 of the processed article 100.

The laser processing apparatus 10 performs processing with a fiber laser if the processing conditions have been determined (Step S24). Specifically, the laser processing apparatus 10 brings about a state where the processed article 100 is irradiated with the fiber laser L1 radiated from the fiber laser light source 62, using the switching mechanism 74, irradiates the processed article 100 with the fiber laser L1, and performs ablation of the processed article 100. The laser processing apparatus 10 ablates the protection layer 104 and the metal layer 102 of the processed article 100 with the fiber laser L1. That is, the laser processing apparatus 10 collectively processes the protection layer 104 and the metal layer 102 of the processed article 100 with the fiber laser L1. Accordingly, as illustrated in FIG. 14A, a hole 120b is formed in the protection layer 104 and the metal layer 102 of the processed article 100. Additionally, heat-affected layers 122b and 124 are formed around the hole 120b. The heat-affected layer 122b is formed in an area radially outside the hole 120b from a wall surface of the hole 120b in the metal layer 102 due to irradiation with the fiber laser L1. The heat-affected layer 124 is formed in an area radially outside the hole 120b from the wall surface of the hole 120b in the protection layer 104 due to irradiation with the fiber laser L1. Here, the laser processing apparatus 10 irradiates an area in the inside of the hole 120b with the fiber laser L1.

If the laser processing apparatus 10 has performed processing with a fiber laser, processing is performed with a short-pulse laser (Step S26). Specifically, the laser processing apparatus 10 brings about a state where the processed article 100 is irradiated with the short-pulse laser L2 radiated from the short-pulse laser light source 64, using the switching mechanism 74, irradiates the area where the hole 120b of the processed article 100 has been formed with the short-pulse laser L2, and performs ablation of the processed article 100. The laser processing apparatus 10 ablates the protection layer 104 of the processed article 100 with the short-pulse laser L2. Accordingly, as illustrated in FIG. 14B, a portion of the wall surface of the protection layer 104 of the processed article 100 is ablated. Accordingly, a portion of the heat-affected layer 124 irradiated and generated with the fiber laser L1 is ablated, and a heat-affected layer 114a is formed. Additionally, by processing the protection layer 104 with the short-pulse laser L2, the hole formed in the protection layer 104 becomes a hole with a larger diameter than the hole formed in the metal layer 102. The laser processing apparatus 10 ends main processing if processing has been performed with a short-pulse laser.

The laser processing apparatus 10, as described above, can form the hole 120b by the penetration of the fiber laser L1, and then, irradiate the vicinity of the wall surface of the hole 120b of the protection layer 104 with the short-pulse laser L2, thereby making a heat-affected layer of the protection layer 104 around the hole 120b small. Additionally, by forming the through-hole 120b by the penetration of the fiber laser L1, the processing time can be further shortened.

Next, an example of the laser processing method will be described with reference to FIG. 15. Here, in an example illustrated in FIG. 15, the processed article 100 when processing starts is in a state of only having the metal layer 102 with the protection layer 104 being not formed. The laser processing apparatus 10 determines processing conditions (Step S32). Specifically, the processing time, the rotating speed of a laser, the output of a laser, and the like are determined on the basis of respective thicknesses and materials, and the like of the metal layer 102 and the protection layer 104 of the processed article 100.

The laser processing apparatus 10 performs hole making processing if the processing conditions have been determined (Step S34). Specifically, a hole is formed in the metal layer 102. Although the above-described fiber laser may be used as a method of forming the hole, machining using a cutting tool may be performed. In addition, in this case, in the laser processing apparatus 10, a machining head that performs machining may be provided separately from the frame 12, or a machining head installed in the frame 12 may be provided.

The laser processing apparatus 10 forms a protection film if the hole making processing has been performed (Step S36). The protection film is formed by performing thermal spraying or the like on the metal layer 102 where the hole has been formed. The protection film serves as the protection layer 104 of the present embodiment. Accordingly, as illustrated in FIG. 16, a protection layer 104a in which no hole opens to the metal layer 102a where the hole 130 has been formed is formed.

The laser processing apparatus 10 performs processing with a short-pulse laser if the protection film has been formed (Step S38). Specifically, as illustrated in FIG. 16, a position corresponding to a portion where the hole 130 of the protection layer 104a is formed is irradiated with the short-pulse laser L2. Here, it is preferable that the short-pulse laser L2 is radiated from a direction along the wall surface of the hole 130. The laser processing apparatus 10 ends main processing if processing has been performed with a short-pulse laser.

In this way, even when the protection layer 104a is formed after the hole 130 is formed in the metal layer 102a, a heat-affected layer corresponding to a hole formed in the protection layer 104a can be made to become small by processing an area 132 of the protection layer 104a with the short-pulse laser L2 and forming the hole.

Here, in the above embodiment, whether a laser radiated to the processed article 100 is a fiber laser or whether the laser is a short-pulse laser is switched using the switching mechanism 74. However, the invention is not limited to this. Hereinafter, other examples of the laser processing apparatus will be described with reference to FIGS. 17 to 21. In addition, since the following examples are the same as that of the laser processing apparatus of the above embodiment except the configuration of the switching mechanism, only the configuration of the laser processing unit 22 including the switching mechanism will be illustrated.

Figure 17:
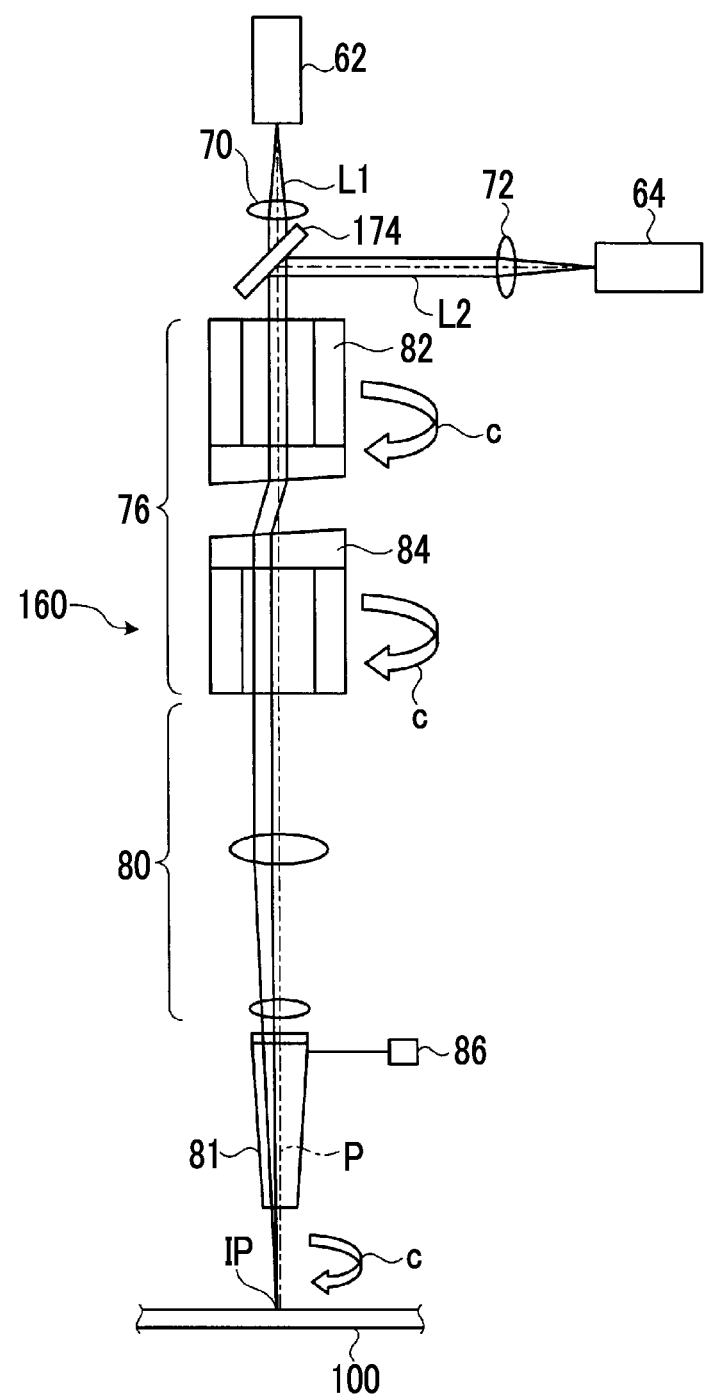
FIG. 17 is a schematic view illustrating a schematic configuration of a laser processing apparatus related to another embodiment.

FIG. 17 is a schematic view illustrating a schematic configuration of a laser processing apparatus related to another embodiment. A laser processing head 160 of the laser processing unit 22 illustrated in FIG. 17 has a half mirror 174 instead of the switching mechanism 74. The half mirror 174 is arranged at a position where the fiber laser L1 and the short-pulse laser L2 overlap each other. Specifically, the half mirror 174 is arranged at a position where the short-pulse laser L2 having passed through the collimating optical system 72 arrives, between the collimating optical system 70 and the laser turning section 76. The half mirror 174 has the properties of reflecting light with the wavelength of the short-pulse laser L2 and transmitting light with the wavelength of the fiber laser L1. In the laser processing head 160, the fiber laser L1 is transmitted through the half mirror 174 and thereby is incident on the laser turning section 76, and the short-pulse laser L2 is reflected by the half mirror 174 and thereby is incident on the laser turning section 76.

In this way, the laser processing apparatus can cause both the fiber laser L1 and the short-pulse laser L2 to be incident on the laser turning section 76 even though the half mirror 174 is used instead of the switching mechanism 74. In addition, when the half mirror is used as in the present embodiment, it is preferable to use lasers with separate wavelengths as the fiber laser L1 and the short-pulse laser L2.

Figure 18:
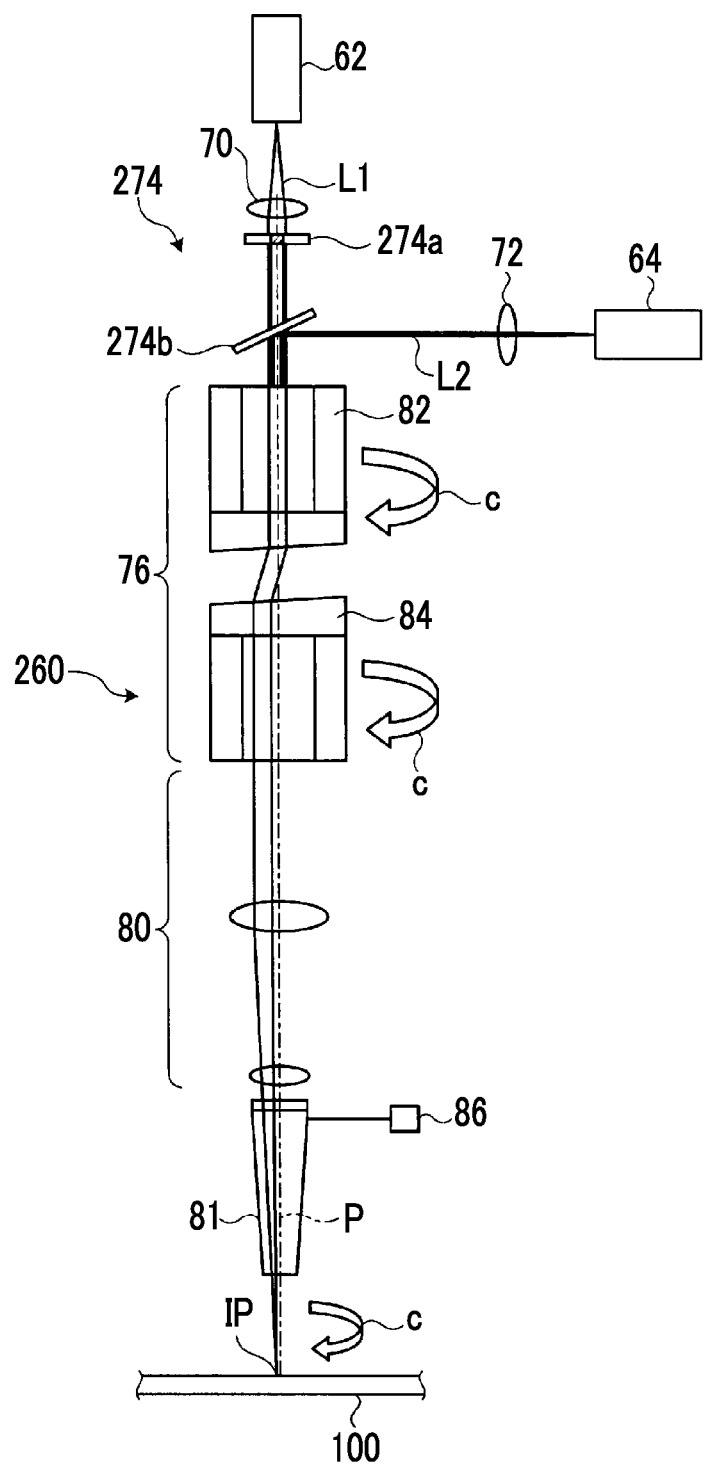
FIG. 18 is a schematic view illustrating a schematic configuration of a laser processing apparatus related to still another embodiment.
Figure 19:
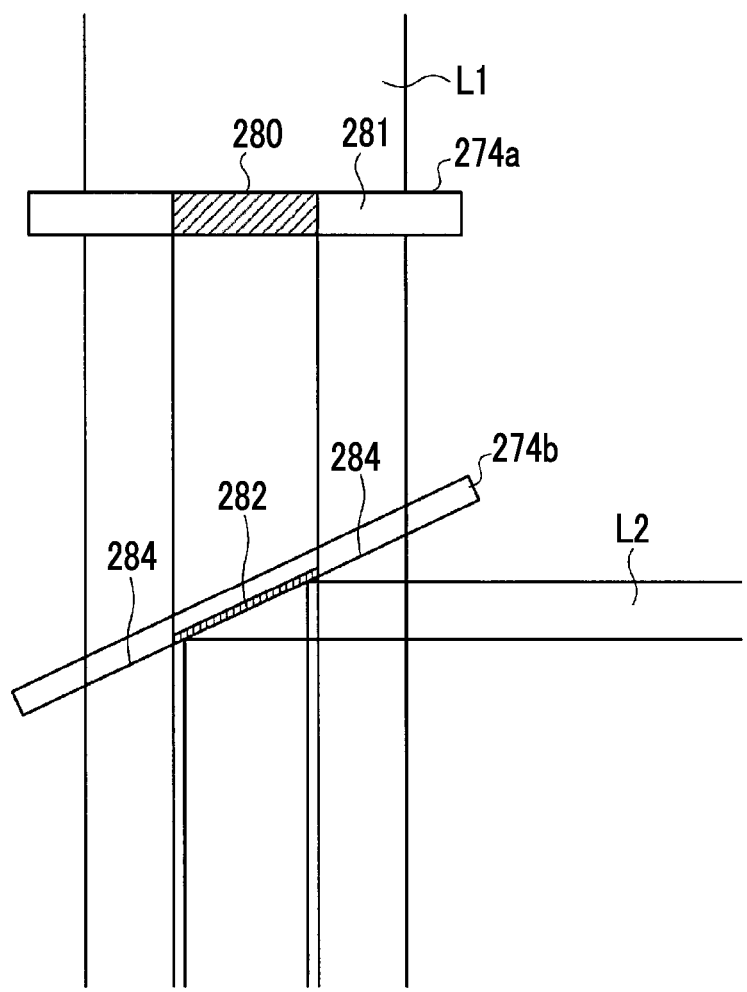
FIG. 19 is a schematic view illustrating a partial configuration of a switching mechanism of the laser processing apparatus related to still another embodiment.
Figure 20:
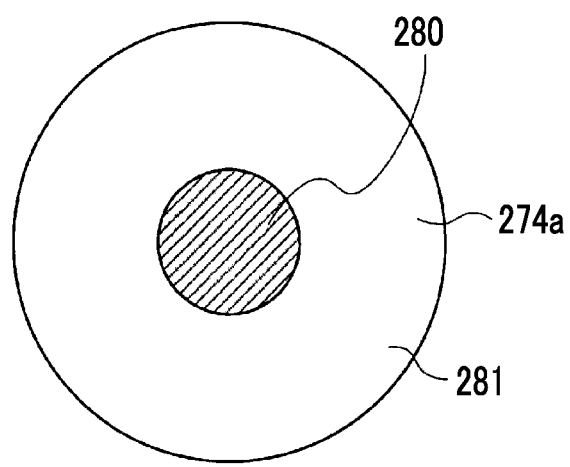
FIG. 20 is a schematic view illustrating a partial configuration of the switching mechanism of the laser processing apparatus related to still another embodiment.
Figure 21:
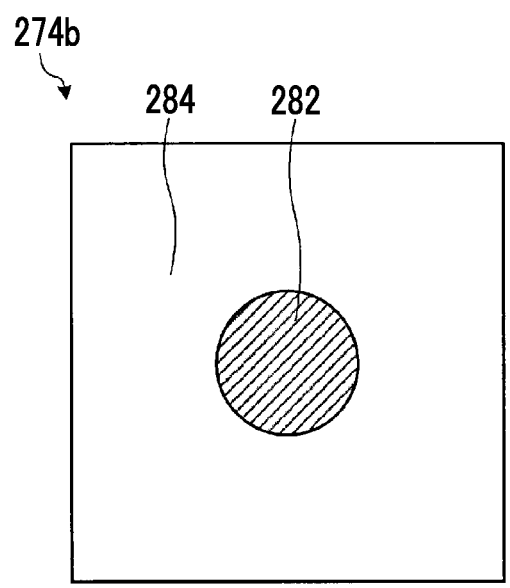
FIG. 21 is a schematic view illustrating a partial configuration of the switching mechanism of the laser processing apparatus related to still another embodiment.

FIG. 18 is a schematic view illustrating a schematic configuration of a laser processing apparatus related to still another embodiment. FIGS. 19 to 21 are respectively schematic views illustrating a partial configuration of a switching mechanism of the laser processing apparatus related to the other embodiment. A laser processing head 260 of the laser processing unit 22 illustrated in FIG. 18 has a switching optical system 274 instead of the switching mechanism 74. The switching optical system 274, as illustrated in FIGS. 18 and 19, has a partial light-shielding plate 274a and a partial reflection plate 274b.

The partial light-shielding plate 274a is arranged on the downstream side of the collimating optical system 70 through which the fiber laser L1 passes, and the fiber laser L1 having passed through the collimating optical system 70 is incident on the partial light-shielding plate. In the partial light-shielding plate 274a, as illustrated in FIGS. 19 and 20, a shielding part 280 that shields circular light is provided at the center of an area through which the fiber laser L1 passes, and a transmission part 281 that allows light to be transmitted therethrough is provided outside the shielding part 280. The partial light-shielding plate 274a shields the light of the incident fiber laser L1 that has entered the shielding part 280, and allows light, which has entered the transmission part 281, to be transmitted therethrough, thereby forming the fiber laser L1 as ring-shaped light.

The partial reflection plate 274b is arranged at a position where the fiber laser L1 and the short-pulse laser L2 overlap each other. Specifically, the partial reflection plate 274b is arranged at a position where the short-pulse laser L2 having passed through the collimating optical system 72 arrives, between the collimating optical system 70 and the laser turning section 76 (specifically, the partial light-shielding plate 274a and the laser turning section 76). In the partial reflection plate 274b, as illustrated in FIGS. 19 and 21, a reflection part 282 that reflects circular light is provided at the center of an area through which the short-pulse laser L2 passes, and a transmission part 284 that allows light to be transmitted therethrough is provided outside the reflection part 282. In the partial reflection plate 274b, the short-pulse laser L2 is incident on the reflection part 282, and the ring-shaped fiber laser L1 is incident on the transmission part 284. The partial reflection plate 274b causes the incident short-pulse laser L2 to be reflected by the reflection part 282 and be incident on the laser turning section 76. Additionally, the partial reflection plate 274b causes the incident ring-shaped fiber laser L1 to be transmitted through the transmission part 284 and be incident on the laser turning section 76. That is, the ring-shaped fiber laser L1 is transmitted through the transmission part 284 that has a central portion corresponding to the reflection part 282 and that is an area around the reflection part 282.

In this way, the laser processing apparatus can overlap paths of light with each other, thereby causing two lasers to be incident on the laser turning section 76 in the same direction, after the shapes of the fiber laser L1 and the short-pulse laser L2 are adjusted.

Figure 22:
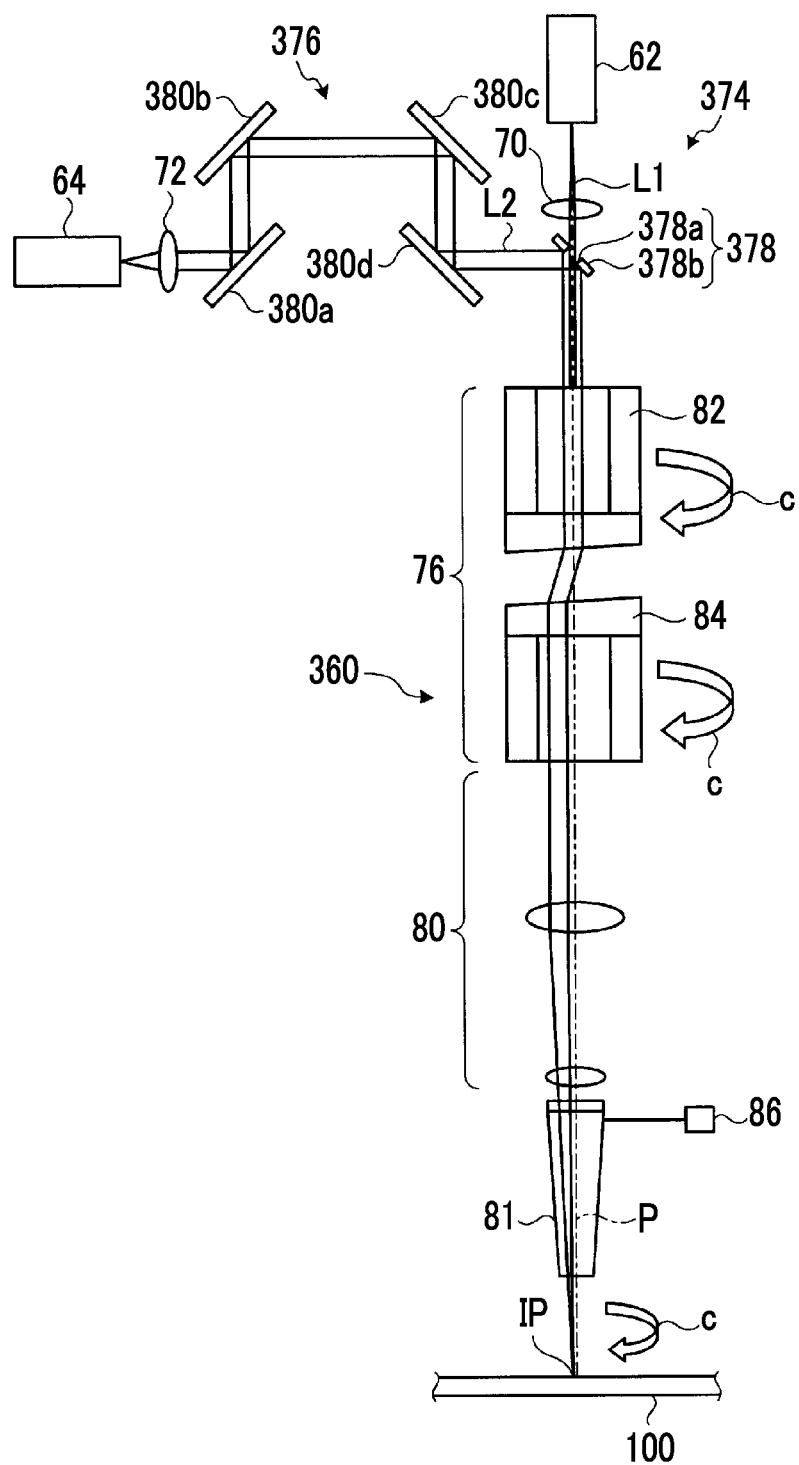
FIG. 22 is a schematic view illustrating a schematic configuration of a laser processing apparatus related to still another embodiment.

FIG. 22 is a schematic view illustrating a schematic configuration of a laser processing apparatus related to still another embodiment. A laser processing head 360 of the laser processing unit 22 illustrated in FIG. 22 has a switching optical system 374 instead of the switching mechanism 74. The switching optical system 374 has a reflection optical system 376 and a partial reflection plate 378.

The reflection optical system 376 has a plurality of reflecting plates 380a, 380b, 380c, and 380d. The reflecting plates 380a, 380b, 380c, and 380d are members that reflect light, and reflect the short-pulse laser L2 radiated from the short-pulse laser light source 64 and collimated by the collimating optical system 72, and cause the short-pulse laser to be incident on the partial reflection plate 278 in a set orientation, that is, in an orientation orthogonal to the fiber laser L1. In addition, although the reflection optical system 376 has been used in the present embodiment, light may be guided by an optical fiber.

The partial reflection plate 378 is arranged at a position where the fiber laser L1 and the short-pulse laser L2 overlap each other. Specifically, the partial reflection plate 378 is arranged at a position where the short-pulse laser L2 having passed through the reflection optical system 376 arrives, between the collimating optical system 70 and the laser turning section 76. In the partial reflection plate 378, an opening 378a for circular light is provided at the center of an area through which the short-pulse laser L2 passes, and a reflection part 378b that reflects light is provided outside the opening 378a. In the partial reflection plate 378, the short-pulse laser L2 is incident on the surrounding reflection part 378b, and the fiber laser L1 is incident on the opening 378a at the center. The partial reflection plate 378 causes a portion excluding the center of the incident short-pulse laser L2 to be reflected by the reflection part 378b and be incident on the laser turning section 76. Additionally, the incident ring-shaped fiber laser L1 passes through the opening 378a formed at the center of the partial reflection plate 378, and is incident on the laser turning section 76. Additionally, in the partial reflection plate 378, a portion on the center of the incident short-pulse laser L2 passes through the opening 378a.

In the laser processing head 360, the light radiated from the fiber laser light source 62 passes through the partial reflection plate 378 and is incident on the laser turning section 76 after the light passes through and is collimated by the collimating optical system 70. The light radiated from the short-pulse laser light source 64 is incident on the reflection optical system 376 after the light passes through and is collimated by the collimating optical system 72. The short-pulse laser L2 is reflected by the reflection optical system 376, is partially (a ring-shaped portion excluding the center side) reflected by the partial reflection plate 378, and is incident on the laser turning section 76.

In this way, the laser processing apparatus can overlap paths of light with each other, thereby causing two lasers to be incident on the laser turning section 76 in the same direction, after the shapes of the fiber laser L1 and the short-pulse laser L2 are adjusted.

In addition, in all of the above embodiments, a fiber laser is guided on a linear path, and a short-pulse laser is guided on a reflecting path. However, the invention is not limited this, a reversed arrangement may be adopted or both of the lasers may be reflected. Additionally, in the present embodiment, a case where two types of laser are used has been illustrated. However, three or more types of laser may be used.

Figure 23:
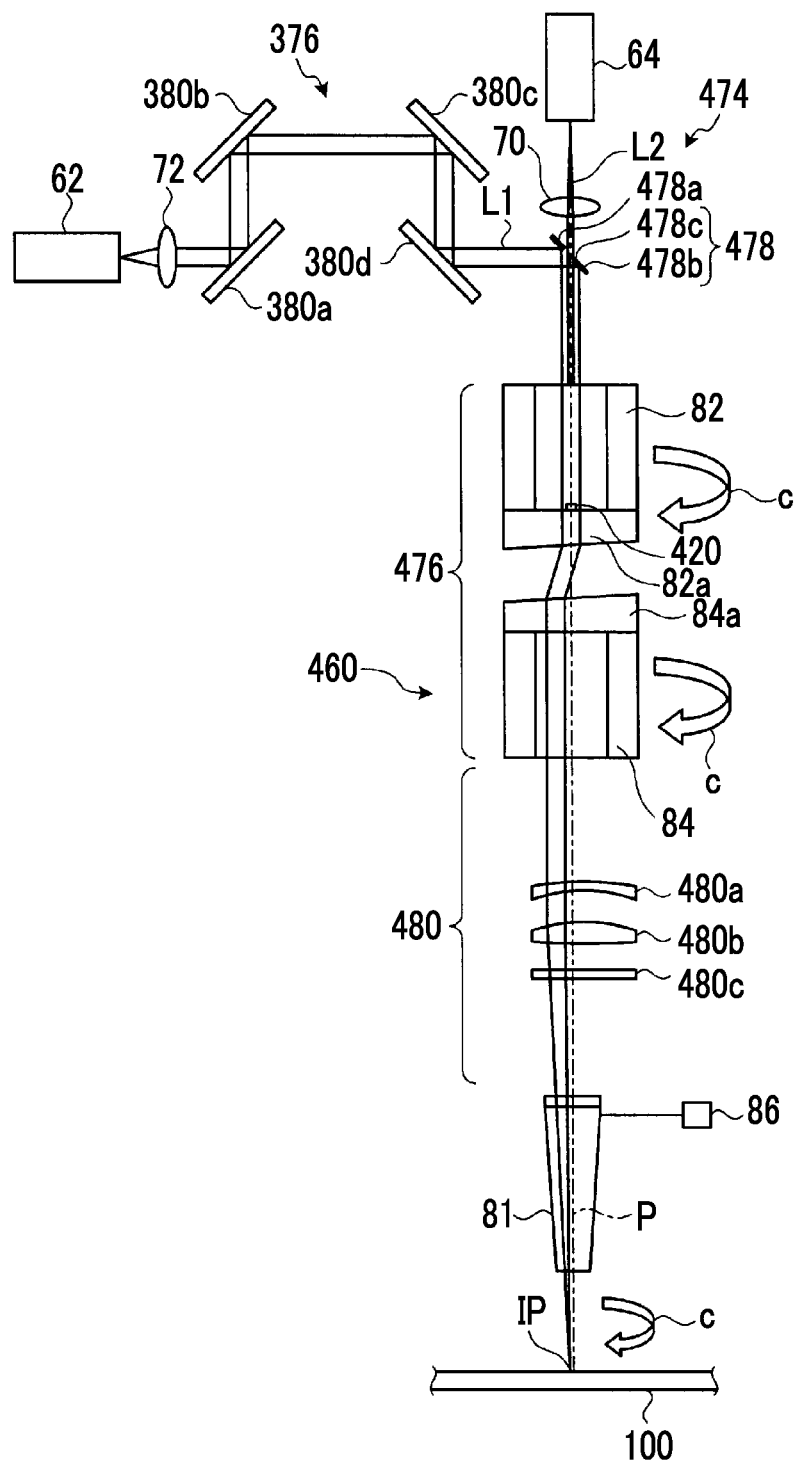
FIG. 23 is a schematic view illustrating a schematic configuration of the laser processing apparatus related to still another embodiment.
Figure 24:
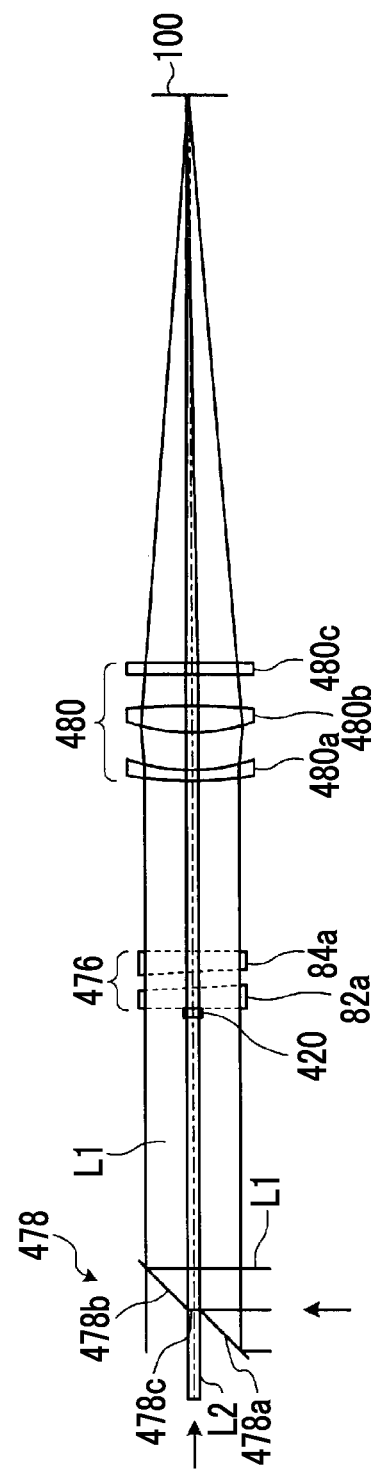
FIG. 24 is a schematic view illustrating a schematic configuration of an optical system of the laser processing apparatus illustrated in FIG. 23.
Figure 25:
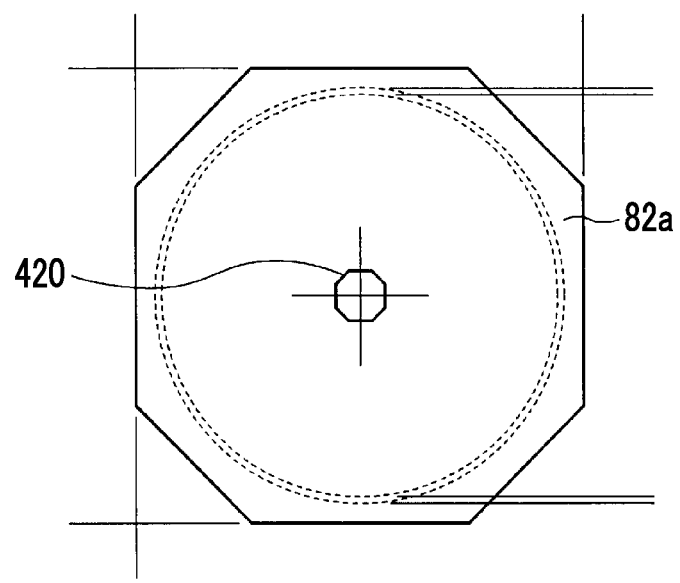
FIG. 25 is a schematic view of a track adjusting mechanism and a prism as viewed from an incidence direction of a laser.
Figure 26:
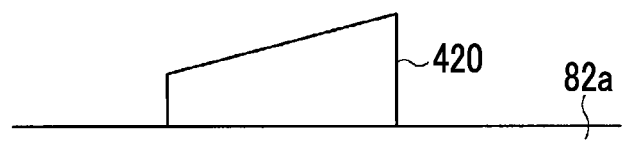
FIG. 26 is a schematic view of the track adjusting mechanism and the prism as viewed from a direction orthogonal to the incidence direction of the laser.
Figure 27:
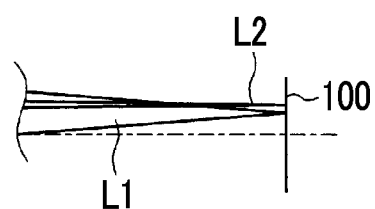
FIG. 27 is an enlarged view illustrating the vicinity of the radiation position of the laser in an enlarged manner.

Next, still another embodiment of the laser processing apparatus will be described with reference to FIGS. 23 to 27. FIG. 23 is a schematic view illustrating a schematic configuration of a laser processing apparatus related to still another embodiment. FIG. 24 is a schematic view illustrating a schematic configuration of an optical system of the laser processing apparatus illustrated in FIG. 23. FIG. 25 is a schematic view of a track adjusting mechanism and a prism as viewed from an incidence direction of a laser. FIG. 26 is a schematic view of the track adjusting mechanism and the prism as viewed from a direction orthogonal to the incidence direction of the laser. FIG. 27 is an enlarged view illustrating the vicinity of the radiation position of the laser in an enlarged manner.

The laser processing apparatus illustrated in FIG. 23 is basically the same as the laser processing apparatus 10 except for the structure of a laser processing head. Hereinafter, points specific to the laser processing apparatus illustrated in FIG. 23 will be described. The laser processing apparatus illustrated in FIG. 23 guides the short-pulse laser L2 output from the short-pulse laser light source 64 on a linear path, and guides the fiber laser L1 output from the fiber laser light source 62 on a reflecting path.

A laser processing head 460 has basically the same configuration as the laser processing head 360 except that the positions where the short-pulse laser light source 64 and the fiber laser light source 62 are arranged are reversed to that in the arrangement of the laser processing head 360, and a track adjusting mechanism 420 is included. Additionally, a laser turning section 476 of the laser processing head 460 integrally rotates a first prism unit 82 having a prism 82a and a second prism unit 84 having a prism 84a, thereby rotating the radiation positions of the fiber laser L1 and the short-pulse laser L2. Additionally, a focusing optical system 480 of the laser processing head 460 has a lens 480a, a lens 480b, and a lens 480c.

The laser processing head 460 reflects the fiber laser L1 with a partial reflection plate 478 of a switching optical system 474 after the fiber laser L1 is reflected by the reflection optical system 376. The partial reflection plate 478 has a reflecting plate 478a and a reflecting plate 478b. The two reflecting plates 478a and 478b, as illustrated in FIG. 24, are arranged at positions shifted from each other with respect to the traveling direction of the fiber laser L1. A space 478c is formed between the reflecting plate 478a and the reflecting plate 478b by the partial reflection plate 478 being arranged at a position shifted with respect to the traveling direction of the fiber laser L1. In the laser processing head 460, the short-pulse laser L2 passes through the space 478c. In this way, in the laser processing head 460, the short-pulse laser L2 passes through the vicinity of a rotation center, and the fiber laser L1 passes through the periphery of the short-pulse laser L2. Here, although FIG. 23 emphasizes and illustrates a state where the central axes of the fiber laser L1 and the short-pulse laser L2 are shifted from each other in the laser turning section 476, the fiber laser L1 and the short-pulse laser L2, as illustrated in FIG. 24, pass through separate areas and do not overlap each other when passing through the laser turning section 476 and the focusing optical system 480.

Here, the laser processing head 460 includes the track adjusting mechanism 420. The track adjusting mechanism 420 is a mechanism that adjusts the track of the short-pulse laser L2, and is fixed to a flat surface of the prism 82a of the first prism unit 82 of the laser turning section 476. Specifically, the track adjusting mechanism 420, as illustrated in FIG. 25, is arranged in an area, through which the short-pulse laser L2 passes, which is the rotation center of the prism 82a. Additionally, the track adjusting mechanism 420 is arranged inside an area through which the fiber laser L1 passing through a position farther from the rotation center than the short-pulse laser L2 passes. That is, the track adjusting mechanism 420 is not arranged in the area through which the fiber laser L1 passes. The track adjusting mechanism 420 of the present embodiment is a prism as illustrated in FIG. 26, and reflects the incident short-pulse laser L2 in a predetermined direction. The track adjusting mechanism 420 rotates together with the prism 82a of the first prism unit 82.

By providing the track adjusting mechanism 420, reflecting the short-pulse laser L2, and not reflecting the fiber laser L1, the laser processing head 460 can radiate the short-pulse laser L2 to a position farther from the rotation center than the fiber laser L1, at a position where the processed article 100 is irradiated as illustrated in FIG. 27, even if the relative phases of the first prism unit 82 and the second prism unit 84 of the laser turning section 476 are at the same position. Accordingly, when processing using the short-pulse laser L2 and processing with the fiber laser L1 are switched, the short-pulse laser L2 can be radiated to a position outside the fiber laser L1 without executing the control of shifting the relative phases of the first prism unit 82 and the second prism unit 84 from each other to change the turning radius of a laser. Therefore, the processings using both the short-pulse laser L2 and the fiber laser L1 can be executed in a shorter time, and the processing speed of the processed article 100 can be improved. Additionally, by providing the laser turning section 476 with the track adjusting mechanism 420, the apparatus is not enlarged, optical systems through which the short-pulse laser L2 and the fiber laser L1 pass can be made into different optical systems, and the radiation positions can be shifted from each other.

Additionally, in the present embodiment, the short-pulse laser L2 is made to be incident on the rotation center side. Therefore, the track adjusting mechanism 420 is arranged in the vicinity of the rotation center. However, when the short-pulse laser L2 is radiated to be incident on a position outside the rotation center as in the laser processing head 360, a structure may be adopted in which the track adjusting mechanism 420 is formed in a ring shape, and the track adjusting mechanism 420 is arranged in the area through which the short-pulse laser L2 passes, and the track adjusting mechanism 420 is not arranged in the area through which the fiber laser L1 passes.

Figure 28:
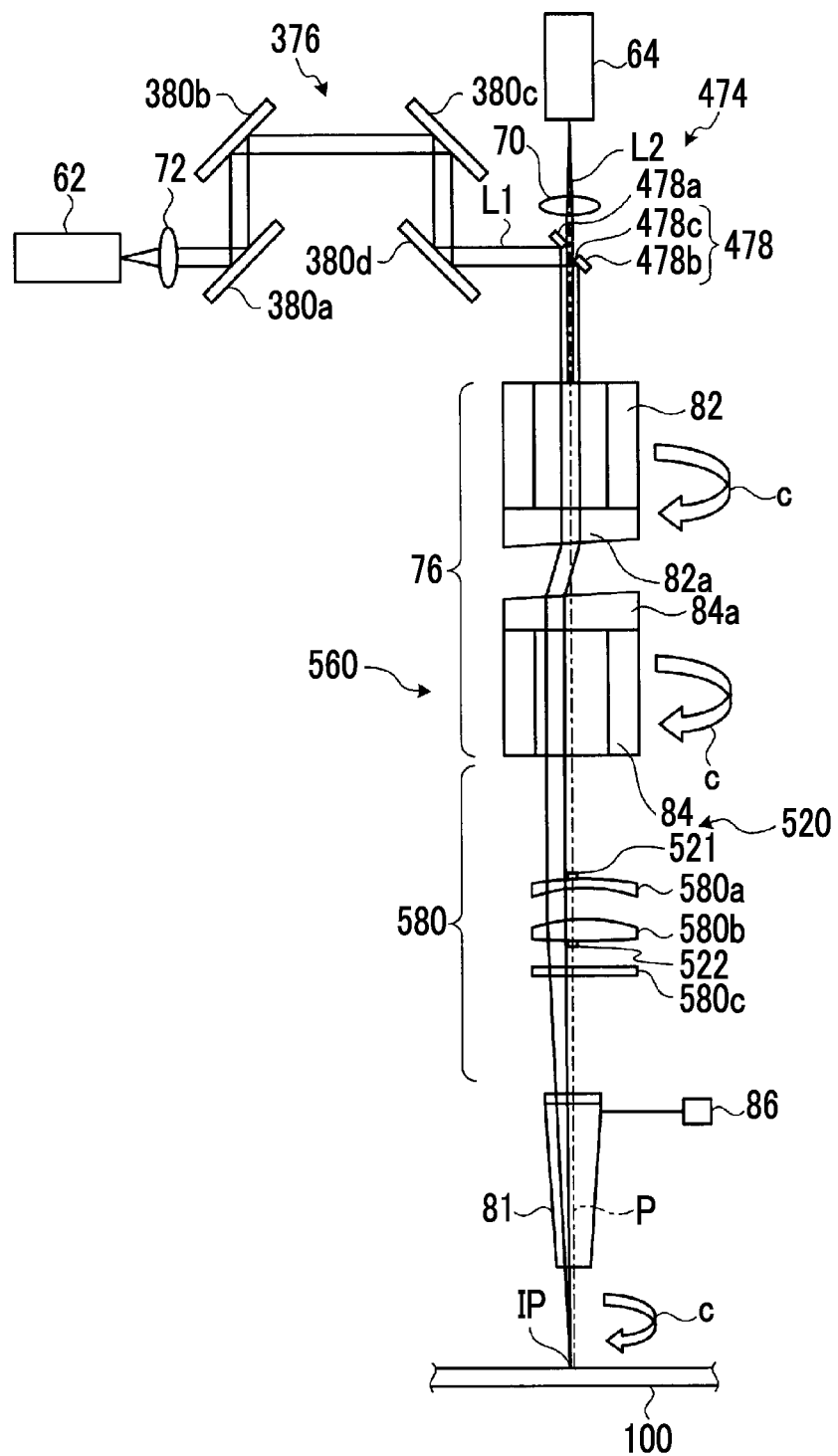
FIG. 28 is a schematic view illustrating a schematic configuration of a laser processing apparatus related to still another embodiment.
Figure 29:
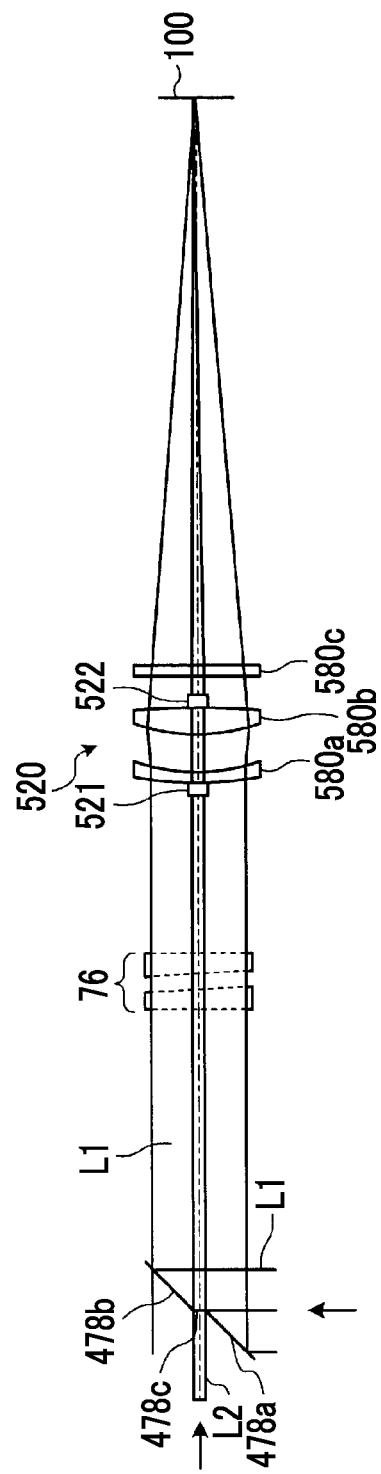
FIG. 29 is a schematic view illustrating a schematic configuration of an optical system of the laser processing apparatus illustrated in FIG. 28.
Figure 30:
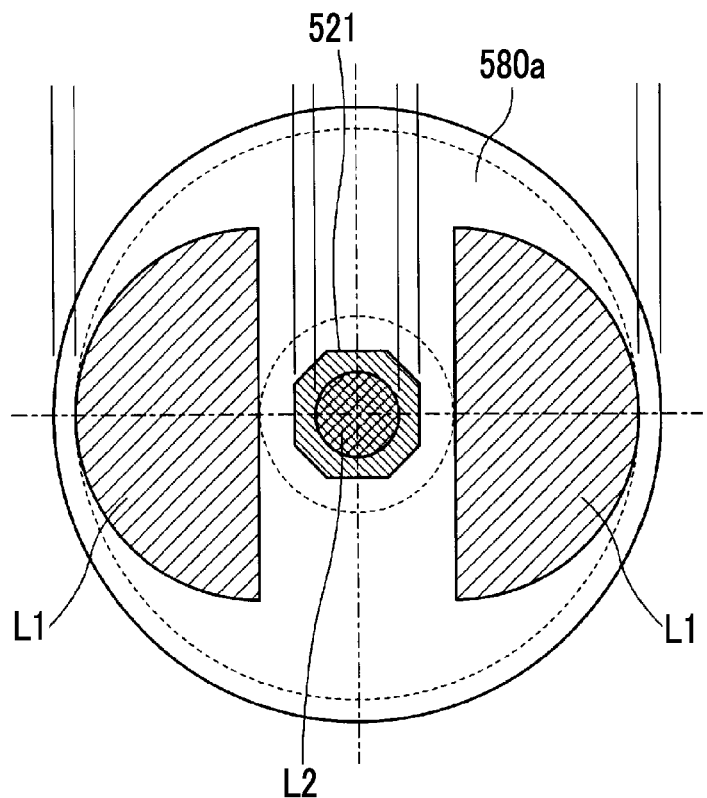
FIG. 30 is a schematic view of a track adjusting mechanism and a focusing lens as viewed from an incidence direction of a laser.
Figure 31:
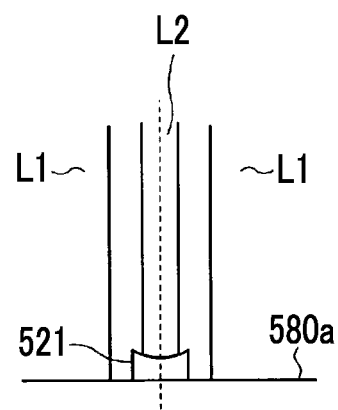
FIG. 31 is a schematic view of the track adjusting mechanism and the focusing lens as viewed from a direction orthogonal to the incidence direction of the laser.
Figure 32:
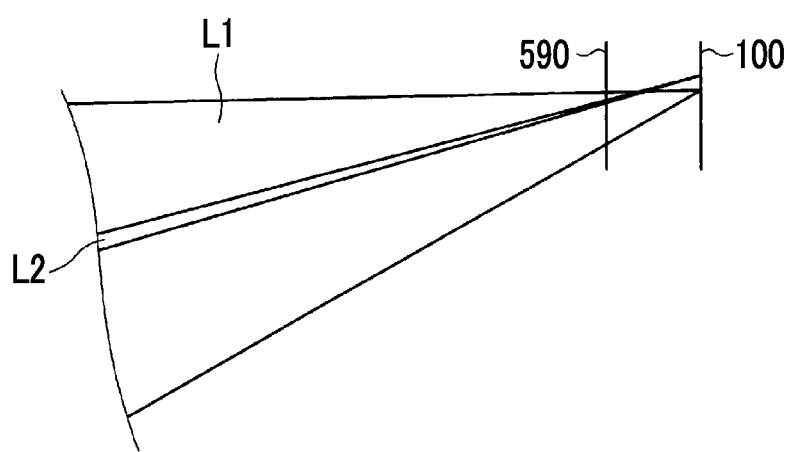
FIG. 32 is an enlarged view illustrating the vicinity of the radiation position of the laser in an enlarged manner.

Here, the track adjusting mechanism is not limited to the prism arranged in the laser turning section. Still another example of the track adjusting mechanism will be described with reference to FIGS. 28 to 32. FIG. 28 is a schematic view illustrating a schematic configuration of a laser processing apparatus related to still another embodiment. FIG. 29 is a schematic view illustrating a schematic configuration of an optical system of the laser processing apparatus illustrated in FIG. 28. FIG. 30 is a schematic view of a track adjusting mechanism and a focusing lens as viewed from an incidence direction of a laser. FIG. 31 is a schematic view of the track adjusting mechanism and the focusing prism as viewed from a direction orthogonal to the incidence direction of the laser. FIG. 32 is an enlarged view illustrating the vicinity of the radiation position of the laser in an enlarged manner.

A laser processing head of the laser processing apparatus illustrated in FIG. 28 is basically the same as the laser processing head illustrated in FIG. 23 except for the structure of the track adjusting mechanism. Hereinafter, points specific to the laser processing head illustrated in FIG. 28 will be described.

In a laser processing head 560, as illustrated in FIGS. 28 and 29, a track adjusting mechanism 520 is provided at a focusing optical system 580. Additionally, the laser turning section 76 of the laser processing head 560 integrally rotates the first prism unit 82 having the prism 82a and the second prism unit 84 having the prism 84a, thereby rotating the radiation positions of the fiber laser L1 and the short-pulse laser L2. Additionally, the focusing optical system 580 of the laser processing head 560 has a lens 580a, a lens 580b, and a lens 580c.

The track adjusting mechanism 520 is a mechanism that adjusts the track of the short-pulse laser L2, and has a lens 521 and a lens 522. The lens 521 is fixed to a flat surface of the lens 580a of the focusing optical system 580 or a portion of the surface thereof. Specifically, the lens 521, as illustrated in FIG. 30, is arranged in an area, through which the short-pulse laser L2 passes, which is the rotation center of the lens 580a. Additionally, the lens 521 is arranged inside an area through which the fiber laser L1 passing through a position farther from the rotation center than the short-pulse laser L2 passes. That is, the lens 521 is not arranged in the area through which the fiber laser L1 passes. The lens 521 of the present embodiment is a lens as illustrated in FIG. 31, and adjusts the focal position of the incident short-pulse laser L2. Additionally, the lens 522 is fixed to a flat surface of the lens 580b of the focusing optical system 580. The lens 522 is different only in arrangement position, and includes the same function at the arrangement position as the lens 521.

By providing the track adjusting mechanism 520, allowing passing of the short-pulse laser L2, and not allowing passing of the fiber laser L1, the focal positions of the short-pulse laser L2 and the fiber laser L1 can be shifted from each other as illustrated in FIG. 32, even if the relative phases of the first prism unit 82 and the second prism unit 84 of the laser turning section 76 are at the same position. In the present embodiment, the focal position of the short-pulse laser L2 is located on a surface 590, and the focal position of the fiber laser L1 is located on the surface of the processed article 100. By shifting the focal positions in this way, specifically, by locating the focal position of the short-pulse laser L2 at a position closer to the near side than the focal position of the fiber laser L1, the short-pulse laser L2 can be radiated to a position farther from the rotation center than the fiber laser L1. Accordingly, when processing using the short-pulse laser L2 and processing with the fiber laser L1 are switched, the short-pulse laser L2 can be radiated to a position outside the fiber laser L1 without executing the control of shifting the relative phases of the first prism unit 82 and the second prism unit 84 from each other to change the turning radius of a laser. Therefore, the processings using both the short-pulse laser L2 and the fiber laser L1 can be executed in a shorter time, and the processing speed of the processed article 100 can be improved. Additionally, by providing the focusing optical system 580 with the track adjusting mechanism 520, the apparatus is not enlarged, optical systems through which the short-pulse laser L2 and the fiber laser L1 pass can be made into different optical systems, and the radiation positions can be shifted from each other.

Additionally, in the present embodiment, the short-pulse laser L2 is made to be incident on the rotation center side. Therefore, the track adjusting mechanism 520 is arranged in the vicinity of the rotation center. However, when the short-pulse laser L2 is radiated to be incident on a position outside the rotation center as in the laser processing head 360, a structure may be adopted in which the track adjusting mechanism 520 is formed in a ring shape, and the track adjusting mechanism 520 is arranged in the area through which the short-pulse laser L2 passes, and the track adjusting mechanism 520 is not arranged in the area through which the fiber laser L1 passes.

Figure 33:
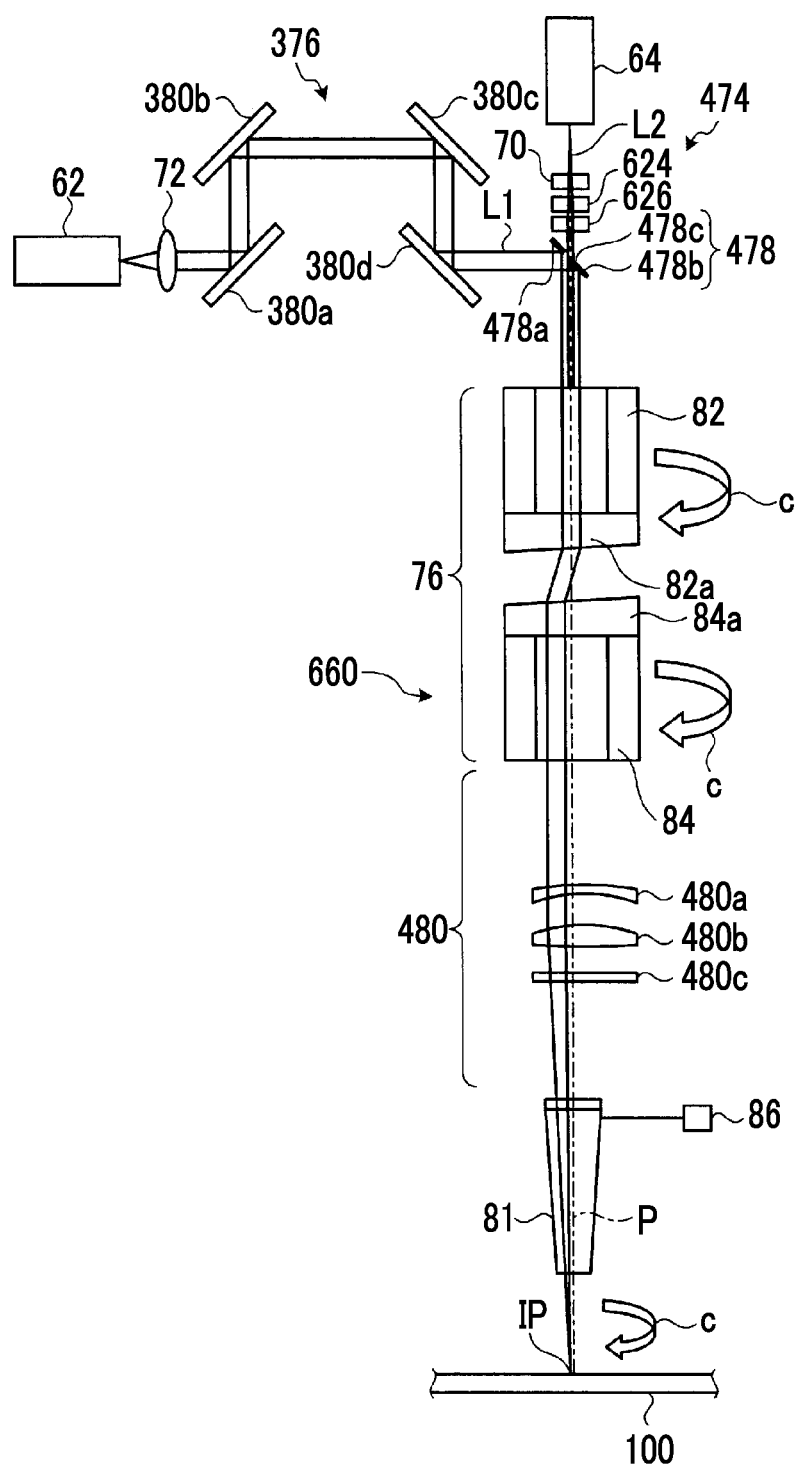
FIG. 33 is a schematic view illustrating a schematic configuration of a laser processing apparatus related to still another embodiment.

Next, still another embodiment of the laser processing apparatus will be described with reference to FIG. 33. FIG. 33 is a schematic view illustrating a schematic configuration of the laser processing apparatus related to still another embodiment. A laser processing head of the laser processing apparatus illustrated in FIG. 33 is basically the same as the laser processing head illustrated in FIG. 23 except for including a radiation position adjusting mechanism in addition to the track adjusting mechanism. Hereinafter, points specific to the laser processing head illustrated in FIG. 33 will be described.

A laser processing head 660 illustrated in FIG. 33 has a focus adjusting mechanism 624 and an inclination adjusting mechanism 626 as the radiation position adjusting mechanism. The focus adjusting mechanism 624 and the inclination adjusting mechanism 626 are arranged between the collimating optical system 70 and the partial reflection plate 478 on the path (light path) through which the short-pulse laser L2 passes. That is, only the focus adjusting mechanism 624, the inclination adjusting mechanism 626, and the path of the short-pulse laser L2 are provided at positions through which the short-pulse laser L2 passes and through which the fiber laser L1 does not pass. The focus adjusting mechanism 624 is a mechanism that adjusts the focal position of the short-pulse laser L2, and an optical system in which a plurality of lenses are combined together can be used as the focus adjusting mechanism 624. The inclination adjusting mechanism 626 adjusts the angle of the short-pulse laser L2, specifically, adjusts an angle with respect to the turning center (turning center) of the laser turning section 76.

Figure 34A:
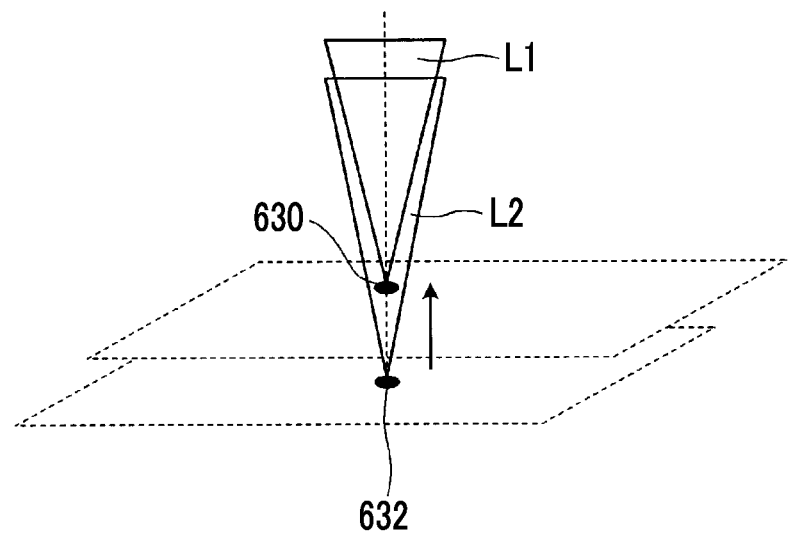
FIG. 34A is an explanatory view for explaining the operation of the laser processing apparatus.
Figure 34B:
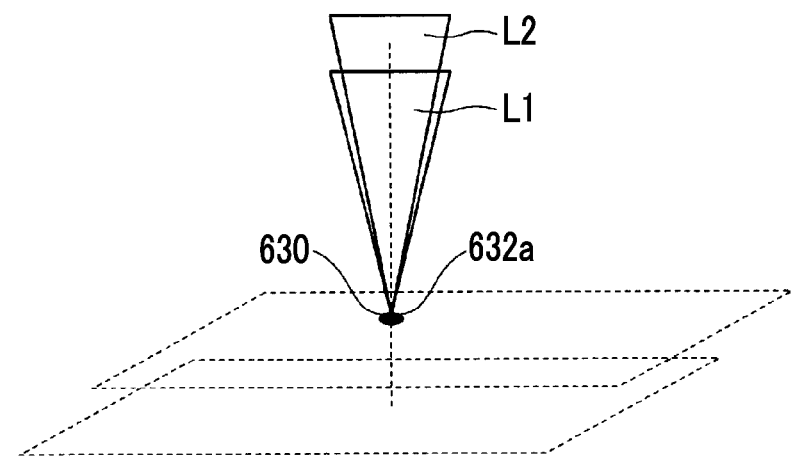
FIG. 34B is an explanatory view for explaining the operation of the laser processing apparatus.

FIGS. 34A and 34B are explanatory views for explaining the operation of the laser processing apparatus, respectively. When the laser processing head 660 includes the focus adjusting mechanism 624, and thereby, as illustrated in FIG. 34A, when a focal position 630 of the fiber laser L1 and a focal position 632 of the short-pulse laser L2 are shifted from each other in a height direction (the traveling direction of a laser), the position of a focal position 632a of the short-pulse laser L2 can be aligned with the focal point position 630, as illustrated in FIG. 34B, by adjusting the focal position 632 of the short-pulse laser L2 with the focus adjusting mechanism 624.

The laser processing head 660 can adjust the focal position of the short-pulse laser L2 due to including the focus adjusting mechanism 624. Accordingly, the focal position of the short-pulse laser L2 with respect to the focal position of the fiber laser L1 can be rapidly adjusted, and even if the position of the entire laser processing head 660 and the laser turning section 76 are not adjusted, processings using the two lasers can be rapidly switched.

Figure 35A:
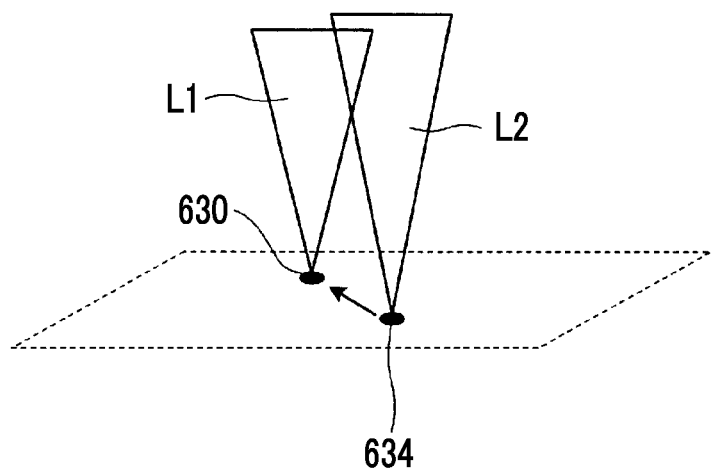
FIG. 35A is an explanatory view for explaining the operation of the laser processing apparatus.
Figure 35B:
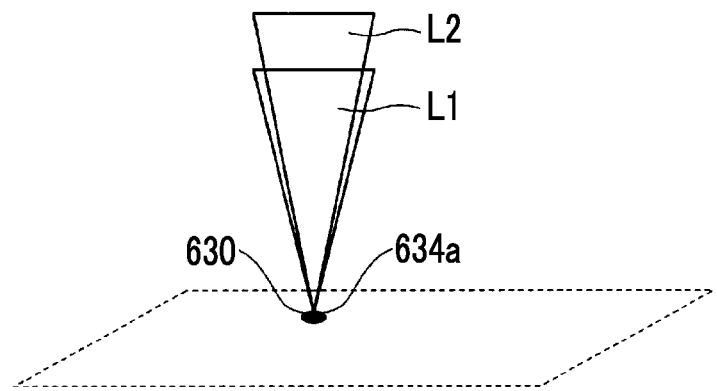
FIG. 35B is an explanatory view for explaining the operation of the laser processing apparatus.

FIGS. 35A and 35B are explanatory views for explaining the operation of the laser processing apparatus, respectively. When the laser processing head 660 includes the inclination adjusting mechanism 626, and thereby, as illustrated in FIG. 35A, when the focal position 630 of the fiber laser L1 and a focal position 634 of the short-pulse laser L2 are shifted from each other in a plane orthogonal to the height direction (the traveling direction of a laser), the position of a focal position 634a of the short-pulse laser L2 can be aligned with the focal point position 630, as illustrated in FIG. 35B, by adjusting the focal position 634 of the short-pulse laser L2 with the inclination adjusting mechanism 626.

The laser processing head 660 can adjust the focal position of the short-pulse laser L2 due to including the inclination adjusting mechanism 626. Accordingly, the focal position of the short-pulse laser L2 with respect to the focal position of the fiber laser L1 can be rapidly adjusted, and even if the position of the entire laser processing head 660 and the laser turning section 76 are not adjusted, processings using the two lasers can be rapidly switched.

In addition, the laser processing head 660 may include only one of the focus adjusting mechanism 624 and the inclination adjusting mechanism 626.

Additionally, in the above embodiments, the processed article 100 is moved in the Y-axis direction by the movable unit 14 and the laser processing head 60 is moved in the X-axis direction and the Z-axis direction. However, the invention is not limited to this. The laser processing apparatus 10 may move the processed article 100 in three directions of the X-axis, the Y-axis, and the Z-axis or may move the laser processing head 60 in the three directions of the X-axis, the Y-axis, and the Z-axis. Additionally, in the laser processing apparatus 10, the stage unit 16 may be provided with the stage moving mechanism and the posture (the orientation and the position in a rotational direction) of the processed article 100 may be adjusted by the stage moving mechanism.

Additionally, in the laser processing apparatus 10 of the above embodiments, two types of laser are radiated by two laser processing heads. However, the invention is not limited to this. The laser processing apparatus 10 only has to be capable of radiating at least a short-pulse laser. Additionally, when another laser is used, the laser is not limited to a fiber laser, and available various lasers can be used. Additionally, the laser processing apparatus 10 may include a head that radiates a short-pulse laser and a head that radiates lasers (a fiber laser and a $CO_2$ laser) other than the short-pulse laser, and may perform the processing using the above short-pulse laser and laser processings other than this. Additionally, means for performing the processings (processing of a metal layer) other than the processing using the above short-pulse laser are not limited to laser processing, and cutting processing may be performed by machining (drilling processing or lathe processing).

The laser processing apparatus 10 of the above embodiments can be suitably used when a processed article on which a protection layer is laminated on a metal layer is processed as described. However, the invention is not limited to this. The laser processing apparatus 10 can also be used for processing of processed articles with other structures.

REFERENCE SIGNS LIST

10: LASER PROCESSING APPARATUS
12: FRAME
14: MOVABLE UNIT
16: STAGE UNIT
22: LASER PROCESSING UNIT
24: CONTROL UNIT
30: Y-AXIS MOVING MECHANISM
34: X-AXIS MOVING MECHANISM
38: Z-AXIS MOVING MECHANISM
39: θY ROTATING MECHANISM
60: LASER PROCESSING HEAD
62: FIBER LASER LIGHT SOURCE
64: SHORT-PULSE LASER LIGHT SOURCE
76: LASER TURNING SECTION
80: FOCUSING OPTICAL SYSTEM
81: NOZZLE
82: FIRST PRISM UNIT
84: SECOND PRISM UNIT
86: ASSIST GAS SUPPLY SOURCE
100: PROCESSED ARTICLE

The invention claimed is:

1. A laser processing method for processing a processed article using a laser processing head radiating a short-pulse laser and a fiber laser that process the processed article,
    wherein the processed article has a laminated structure in which a protection layer is laminated to a metal layer, and
    wherein the laser processing method comprises:
    when the protection layer is laminated to the metal layer before the laser processing, executing either,
        a first short-pulse laser processing step for irradiating the protection layer with the short-pulse laser and ablating the protection layer, a distance between an end surface of the short-pulse laser and an ablated surface of the protection layer being a first distance, the first short-pulse laser processing step forming a heat-affected layer having a first thickness on the ablated surface of the protection layer; and
        a first metal layer processing step for ablating the metal layer with the fiber laser in an area ablated in the first short-pulse laser processing step, the first metal layer processing step forming a heat-affected layer having a second thickness greater than the first thickness on the ablated surface of the metal layer, a distance between an end surface of the fiber laser and an ablated surface of the metal layer being a second distance larger than the first distance sufficient to prevent the fiber laser from hitting the heat-affected layer formed on the protection layer, or
        a second metal layer processing step for collectively ablating the protection layer and the metal layer with the fiber laser, and
        a second short-pulse laser processing step for irradiating the protection layer including an end surface of an area ablated in the second metal layer processing step with the short-pulse laser and ablating the protection layer,
    wherein in the first short-pulse laser processing step, a position where the processed article is irradiated with the short-pulse laser, is rotated.

2. The laser processing method according to claim 1, wherein the short-pulse laser processing step ablates the metal layer to a depth of 0.001 mm or more and 50% or less of the thickness of the metal layer in a direction orthogonal to the surface of the metal layer.

3. The laser processing method according to claim 1, wherein the short-pulse laser processing step ablates the metal layer to a depth of 0.001 mm or more and 50% or less of the thickness of the metal layer in a direction in which the short pulse laser is radiated.

4. The laser processing method according to claim 1, wherein the short-pulse laser processing step and the metal layer processing step are the processing for forming a hole in the processed article, and wherein, in the short-pulse laser processing step, a larger diameter hole, having a larger diameter than the hole formed in the metal layer in the metal layer processing step, is formed in the protection layer.

5. The laser processing method according to claim 1, wherein the short-pulse laser processing step is the processing for forming a ring-shaped opening in the protection layer, wherein the metal layer processing step is the processing for forming a hole in the processed article, and wherein in the short-pulse laser processing step, a larger diameter hole, having a larger diameter than the hole formed in the metal layer in the metal layer processing step, is formed in the protection layer.

6. The laser processing method according to claim 1, wherein the protection layer is formed of a material resisting heat or a material resisting wear.

7. The laser processing method according to claim 1, wherein the laser processing head includes a laser turner turning the short-pulse laser with respect to the processed article, and a focusing optical condenser that condenses the short-pulse laser turned by the laser turner.

\* \* \* \* \*